(12) United States Patent
Le Biannic et al.

(10) Patent No.: US 10,296,658 B2
(45) Date of Patent: May 21, 2019

(54) USE OF CONTEXT-DEPENDENT STATISTICS TO SUGGEST NEXT STEPS WHILE EXPLORING A DATASET

(71) Applicant: Business Objects Software, Ltd., Dublin (IE)

(72) Inventors: Yann Le Biannic, Suresnes (FR); Olivier Hamon, Levallois Perret (FR); Bruno Dumant, Verneuil sur Seine (FR)

(73) Assignee: Business Objects Software, Ltd., Dublin (IE)

( * ) Notice: Subject to any disclaimer, the term of this patent is extended or adjusted under 35 U.S.C. 154(b) by 569 days.

(21) Appl. No.: 14/876,285

(22) Filed: Oct. 6, 2015

(65) Prior Publication Data

US 2016/0371288 A1    Dec. 22, 2016

Related U.S. Application Data

(60) Provisional application No. 62/180,277, filed on Jun. 16, 2015, provisional application No. 62/180,280, filed on Jun. 16, 2015.

(51) Int. Cl.
*G06F 7/00* (2006.01)
*G06F 17/30* (2006.01)

(52) U.S. Cl.
CPC .... *G06F 17/30973* (2013.01); *G06F 17/3053* (2013.01); *G06F 17/3097* (2013.01); *G06F 17/30528* (2013.01); *G06F 17/30991* (2013.01)

(58) Field of Classification Search
CPC .......... G06F 17/3097; G06F 17/30528; G06F 17/30991; G06F 17/30637
USPC ........................ 707/709, 731, 767, 768, 769
See application file for complete search history.

(56) References Cited

U.S. PATENT DOCUMENTS

| 5,485,564 A | 1/1996 | Miura et al. |
| 6,587,102 B2 | 7/2003 | Taylor et al. |
| 6,859,937 B1 | 2/2005 | Narayan et al. |
| 8,898,140 B2 | 11/2014 | Cooper et al. |

(Continued)

OTHER PUBLICATIONS

Non-Final Office Action for U.S. Appl. No. 14/856,979, dated Apr. 3, 2018, 14 pages.

*Primary Examiner* — Md I Uddin
(74) *Attorney, Agent, or Firm* — Mintz Levin Cohn Ferris Glovsky and Popeo, P.C.

(57) ABSTRACT

A computer-implemented method for generating a plurality of data suggestions is described. The method includes receiving a textual input in a user interface of a software application implementing a plurality of business processes, determining a query context associated with the textual input, a user, and data that the user is viewing in the software application, and computing a plurality of statistical metrics for the query context, the statistical metrics being computed using information obtained from datasets associated with the query context. The method also includes determining a plurality of candidate data combinations, the data combinations including a plurality of dimensions, measures, and filters compatible with the query context, ranking the plurality of candidate data combinations according to one of the plurality of statistical metrics, and generating at least one data suggestion using the plurality of candidate data combinations and providing the at least one data suggestion in the user interface.

20 Claims, 17 Drawing Sheets

(56) References Cited

U.S. PATENT DOCUMENTS

| | | | |
|---|---|---|---|
| 2008/0189655 A1* | 8/2008 | Kol | G06Q 10/10 715/808 |
| 2009/0043749 A1 | 2/2009 | Garg et al. | |
| 2010/0211588 A1* | 8/2010 | Jiang | G06F 17/30637 707/768 |
| 2011/0035403 A1* | 2/2011 | Ismalon | G06F 17/3064 707/769 |
| 2012/0191745 A1* | 7/2012 | Velipasaoglu | G06F 17/3064 707/767 |
| 2016/0063093 A1 | 3/2016 | Boucher et al. | |
| 2016/0371395 A1 | 12/2016 | Dumant et al. | |

* cited by examiner

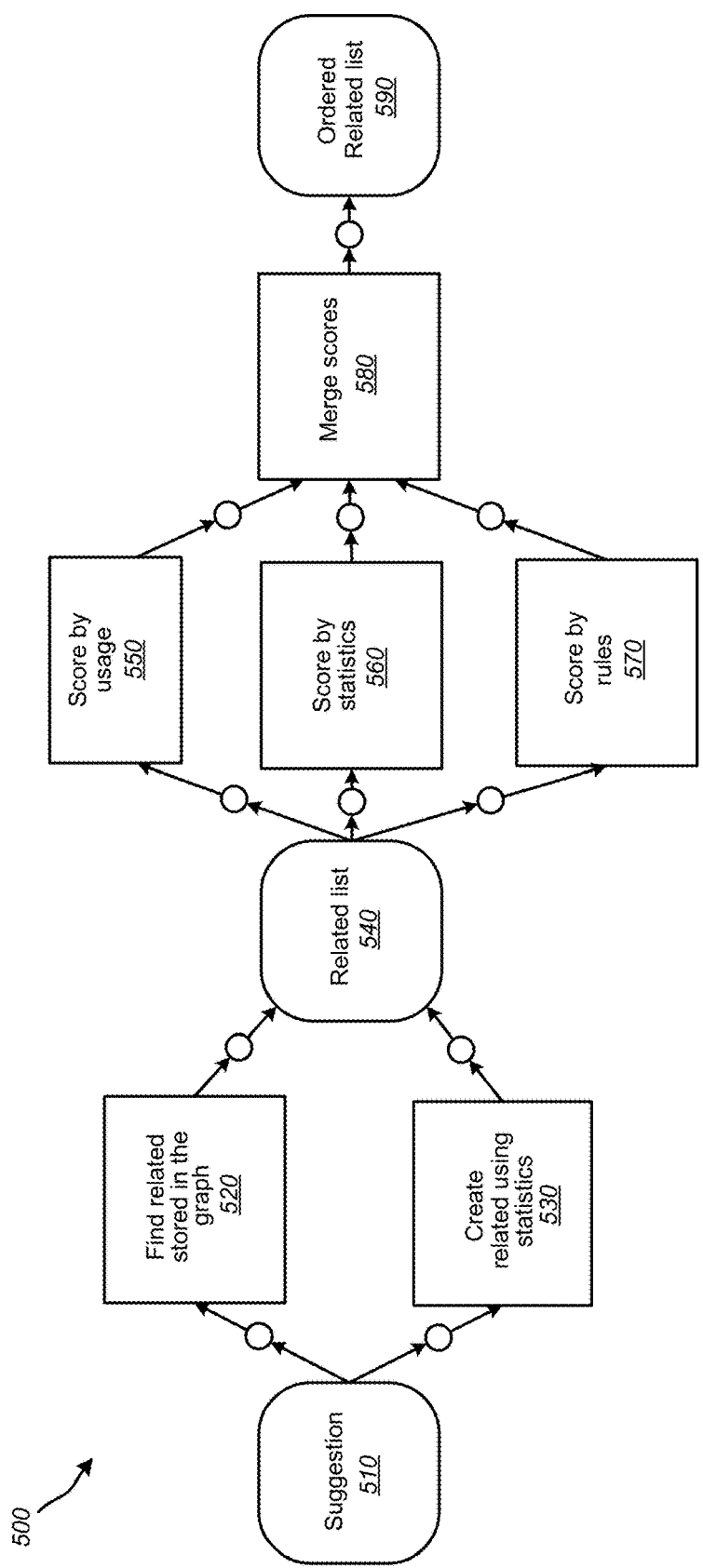

USE OF CONTEXT-DEPENDENT STATISTICS TO SUGGEST NEXT STEPS WHILE EXPLORING A DATASET

CROSS REFERENCE TO RELATED APPLICATION

This application claims the benefit of U.S. Provisional Application No. 62/180,280, filed Jun. 16, 2015, and U.S. Provisional Application No. 62/180,277, filed Jun. 16, 2015, the entire contents of which are incorporated by reference in their entirety.

TECHNICAL FIELD

This description relates to using context-dependent statistics to suggest next steps (e.g., to a user) during the exploration of a dataset.

BACKGROUND

A typical organization, such as a business enterprise collects large amounts of data. In such a situation, sophisticated data solutions are in demand in order to quickly and accurately access data desired by users from massive amounts of data managed by the business enterprise.

SUMMARY

According to one general aspect, a computer-implemented method for generating a plurality of data suggestions is described. The method includes receiving, from a user, a textual input in a user interface of a software application implementing a plurality of business processes and determining a query context associated with the textual input, the user, and data that the user is viewing in the software application. The method also includes computing a plurality of statistical metrics for the query context. The statistical metrics may be computed using information obtained from datasets associated with the query context. The method also includes determining, using the statistical metrics, a plurality of candidate data combinations, the data combinations including a plurality of dimensions, measures, and filters compatible with the query context. Determining a plurality of candidate data combinations may include modifying the query context by performing actions on a dataset associated with the query context, the actions selected from the group consisting of substituting one dimension for another dimension, adding a dimension, adding a measure, and adding a filter. The method also includes ranking the plurality of candidate data combinations according to at least one of the plurality of statistical metrics and generating at least one data suggestion using the plurality of candidate data combinations and providing the at least one data suggestion in the user interface.

One or more implementations may include the following features. For example, the statistical metrics may include correlation calculations between one or more measures. In some implementations, the statistical metrics may be used to recommend one or more graphics corresponding to the at least one data suggestion. In some implementations, the statistical metrics may be used to select an additional correlated measure for at least one of the datasets associated with the query context, and provide the additional correlated measure as a basis for modifying the at least one data suggestion. In some implementations, each statistical metric is modeled in a knowledge graph including a plurality of edges between a vertex, the plurality of edges representing a timestamp associated with a first discovery time for the metric, and a count for each additional discovery time associated with the metric.

Determining a query context associated with the user and data that the user is viewing in the software application may include accessing user profiles and a plurality of datasets associated with the data the user is viewing, aggregating at least two of the plurality of datasets, and extracting information from the user profiles and the aggregated datasets to select a plurality of dimensions and measures that are configured to be correlated.

In some implementations, providing the at least one data suggestion in the user interface may include providing a graphical representation of the data suggestion, the graphical representation depicting a pattern associated with the data suggestion and a plurality of actions to further modify the graphical representation based on the pattern.

According to another general aspect, a query management system is described. The system includes instructions stored on a non-transitory computer-readable storage medium. The system further includes a dataset statistics engine configured to compute a first correlation between a plurality of measures, and compute a second correlation between a plurality of dimensions and determine dependencies between the plurality of dimensions. The system also includes a query engine configured to generate a plurality of search queries based on the first correlation and the second correlation, and a knowledge graph configured to store one or more correlations generated by the dataset statistics engine and to store time-based hierarchical data associated with a plurality of datasets.

One or more implementations may include the following features. For example, the dataset statistics engine may be configured to compute an exception between two or more correlated measures, compute a Pareto distribution for one or more additive measures, and/or compute an exception of a distribution for one or more dimensions, measures, or filters. The dataset statistics engine may be further configured to compute an entropy of at least one measure in the plurality of measures by aggregating the at least one measure over one dimension and in response to detecting the entropy above a predefined threshold level, the dataset statistics engine can generate an edge in the knowledge graph from the at least one measure to the one dimension. Using the predefined threshold level and the entropy, the dataset statistics engine can generate one or more data suggestions.

In some implementations, the dataset statistics engine can compute the correlation between the plurality of measures using an online Knuth algorithm by performing data shifting to avoid cancellation and loss of precision. The dataset statistics engine may additionally be configured to compute the correlation between the plurality of measures using a Pearson correlation coefficient.

According to another general aspect, a computer program product may be tangibly embodied on a non-transitory computer-readable medium/recordable storage medium and may include executable code that, when executed, is configured to cause at least one data processing apparatus to perform the following operations. Specifically, the executable code may cause steps including receiving, from a user, a textual input in a user interface of a software application implementing a plurality of business processes, determining a query context associated with the textual input, the user, and data that the user is viewing in the software application, computing a plurality of statistical metrics for the query context, the statistical metrics being computed using information obtained from datasets associated with the query context, determining, using the statistical metrics, a plurality of candidate data combinations, the data combinations including a plurality of dimensions, measures, and filters compatible with the query context, ranking the plurality of candidate data combinations according to at least one of the plurality of statistical metrics, and generating at least one data suggestion using the plurality of candidate data combinations and providing the at least one data suggestion in the user interface.

The details of one or more implementations are set forth in the accompanying drawings and the description below. Other features will be apparent from the description and drawings, and from the claims.

BRIEF DESCRIPTION OF THE DRAWINGS

FIG. 5 is a flowchart illustrating an example method for suggesting data visualizations based on a user query.

DETAILED DESCRIPTION

Figure 1:
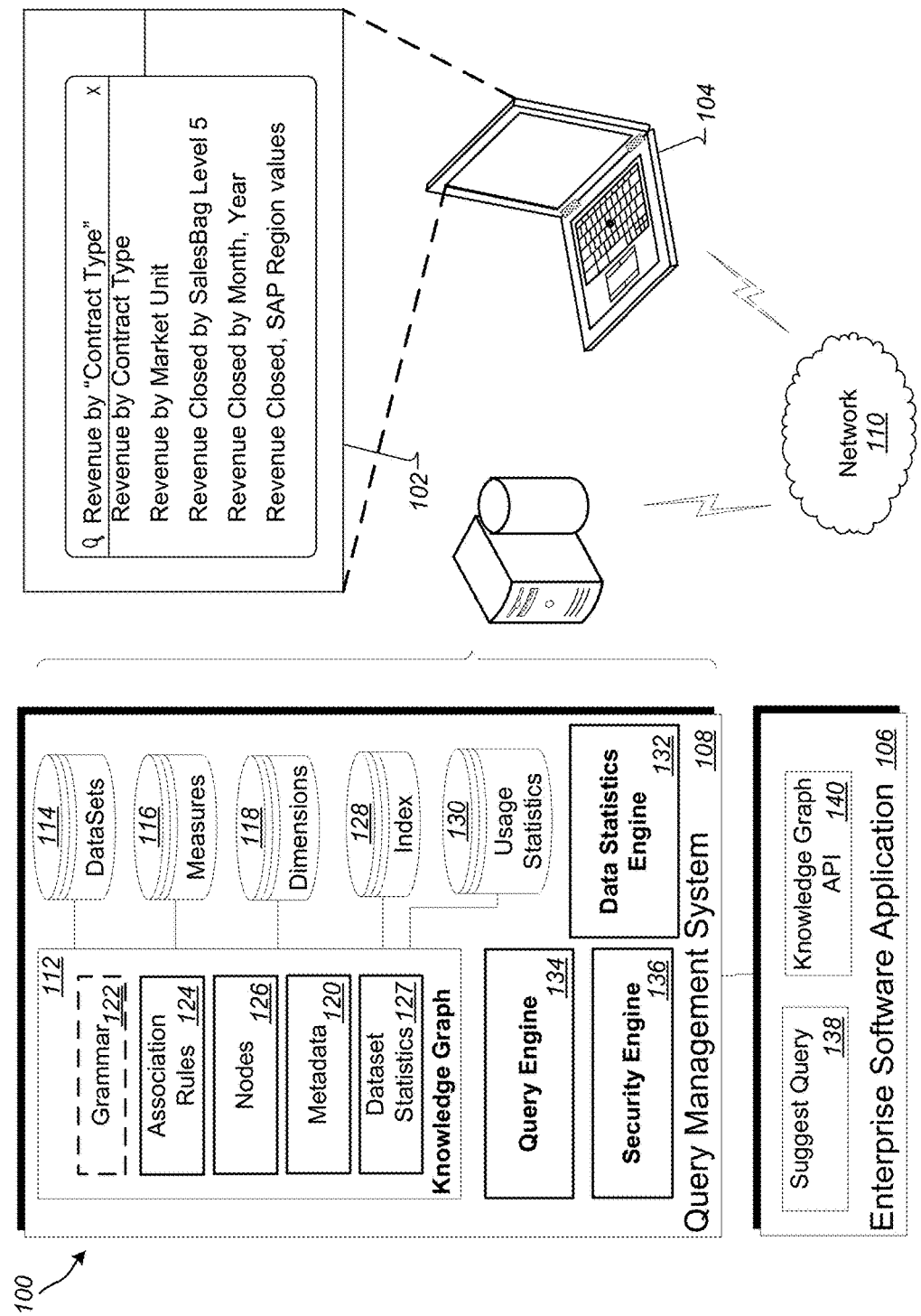
FIG. 1 is a block diagram of a system for generating and providing query suggestions and completions in a user interface associated with business software executing at a client device.

Performing online analytical processing on datasets with tens or hundreds of data dimensions can be a complex task. Data mining algorithms can be used to extract structure and patterns from large datasets with many columns of data, but many of these algorithms may not be capable of operating on the various levels of aggregation and filtering involved in online analytical processing of un-aggregated data. Insights from data mining can be illustrated using a variety of aggregation functions, but many of these algorithms may not be tuned to operate on the various levels of aggregation and filtering involved in online analytical processing. In some implementations, a data mining algorithm may compute incorrect aggregations on data content (e.g., numbers), if the algorithm has no prior knowledge about calculation semantics associated with the numbers. For example, it may be correct to cumulate quantities of goods stored in warehouses over multiple locations, but it may be incorrect or imprecise for data mining algorithms to cumulate such quantities over time. In another example, a measure used in analytical processing may be defined by an arbitrarily complex formula involving multiple aggregated values and such a measure (from an online analytical processing dataset) may be accurately assessed if computed using a dedicated calculation engine for a particular aggregation and filtering context, but may not be accurate using other formulas, aggregation contexts, or filtering contexts. Thus users may benefit from automated insights about online analytical processing datasets that do not match insights typically generated by data mining performed on raw data.

The systems and methods described in this disclosure can perform online analytical processing by adapting a number of data mining techniques to operate on data with a view focused on a current context (e.g., a data aggregation context that is relevant at a given point in time) that an end user may be interested in, including particular dimensions, measures, and filters being accessed. The current context can be used to determine relevant data (e.g., search query suggestions) for presentation to the user, rather than performing data mining on raw unfiltered data. The adapted data mining techniques can be adapted to operate on aggregated data (e.g., summative data). The input of such techniques may include aggregated datasets defined by a particular context. The input may be generated by the systems described in this disclosure.

The systems and methods described in this disclosure can execute such data mining techniques or algorithms by modifying one or more measures using a user-defined context. In this fashion, the applied algorithms may depend on the context being selected. A context may be defined by a combination of dimensions, measures and filters that can be used to obtain context-dependent data (e.g., search query suggestions). The systems and methods described here can be configured to identify one or more modifications in a determined context in order to provide relevant search query suggestions and search results. Modifying one or more contexts can include switching to a different dimension, suggesting an additional dimension, suggesting an additional measure, and/or suggesting an additional filter.

In some implementations, the systems and methods described herein can adapt online analytical processing visualizations (e.g., graphics, combined data structures, metric charts, etc.) to provide a graphical representation that the user can review to determine patterns identified by data mining algorithms, or to highlight exceptions from found patterns. Such visualizations may be provided to explain data suggestions and/or contexts.

In some implementations, the online analytical processing techniques described herein can allow a user (e.g., human analyst) to navigate through a number of successive perspectives on aggregated data. The navigation/exploration can include reducing a number of dimensions (e.g., consolidating, rolling up), adding additional dimensions (e.g., drill down), and applying additional filters (e.g., slice and dice). The techniques can allow an interactive and iterative process of information discovery driven by the user providing a particular context.

In some implementations, the techniques described herein can be used to identify structures and patterns in data and display such structures and patterns to a user. The user can perform additional operations on data identified. The operations may include preparing data or cleansing data to ensure the data is suitable to be processed by one or more of the analytical processing techniques or algorithms described herein. The operations may also include selecting relevant algorithms to produce data models depicting data patterns.

The operations may additionally include evaluating models to assess accuracy and applicability to similar and/or other data.

Identified patterns and exceptions to such patterns can be scored based on a number of system-identified statistics. The statistics may pertain to the information each pattern may provide to a user. Suggested query completions and/or recommended data visualizations can be based on such statistics alone, or in combination with usage information (e.g., associated with a current user of a data system) and/or system rules (such as those described herein).

In some implementations, the systems and methods described in this disclosure can perform compatibility determinations and provide relevant data without burdening the user with the analysis of comparing data, data fields, data attributes, data categories, etc. In short, the systems and methods described in this disclosure can provide relevant query strings to obtain relevant search results (i.e., contextually relevant data) based on dataset statistics 127, usage information (e.g., usage statistics) 130 and/or system rules associated with a particular context (e.g., including characteristic of a current user, entered query terms, etc.).

Referring to FIG. 1, a block diagram of a system 100 is shown. The system 100 may be configured to provide a user interface 102 associated with business software executing at a client device 104. The client device 104 can display the user interface 102, which may be provided by an enterprise software application 106 and/or query management system 108, each executing as one or more server devices and connectable through network 110.

The example user interface 102 shown here includes a business application accessing or running enterprise software application 106 and/or requesting data via query management system 108. The user can access user interface 102 to obtain business data regarding business objects in the enterprise software applications 106. Textual and graphical content displayed in user interface 102 may include business data associated with a number of datasets, measures, and dimensions, each of which can be associated with a knowledge graph 112. In other implementations, data being accessed can be organized in other ways.

Datasets can represent a group of data combined based on a particular query context or based on a business object. The query context may refer to the context of data currently displayed to a user in interface 102. The list of selectable dataset names may be associated with datasets that are compatible with the particular query context, including user-based context. When datasets are presented, an initial dataset is automatically selected by the system 100 and this dataset is typically used to provide the initial query context with respect to measures and dimensions that pertain to the initial dataset. In some implementations, the initial dataset is used to set the query context until a user selects more content from user interface 102. Datasets may be stored and accessed from datasets repository 114.

Measures can represent data objects that include metrics such as sales revenue, salary, inventory stock, or number of employees, etc. In some implementations, the measures include a plurality of data objects that quantitatively define at least one attribute within a number of datasets. Measures provided for selection in the user interface 102 are generally within the query context (e.g., including the user context) configured based on which datasets are selected and the particular user entering the query. In some implementations, a user can select several measures to be included in data presented in interface 102. However, selecting one or more measures can affect other data presented in interface 102. Measures may be stored and accessed from measures repository 116.

Dimensions can represent data objects that include categorical data in a dataset. Example dimensions may include categories such as products for a region or sales for a region. In some implementations, the dimensions may define a plurality of data categories for attributes in a number of datasets. In general, dimensions can include two selection modes. The first selection mode can cause the dimension to be used as an axis of data visualization graph (e.g., by country). The second selection mode can cause the dimension to be used as a filter (e.g., for Q3/2014 as Quarter/Year). For example, selecting a dimension can cause an axis or value to be modified within data depicted in interface 102. In this fashion, selecting dimensions can function to filter data. Dimensions may be stored and accessed from dimensions repository 118.

The example system 100 also includes a knowledge graph 112. The knowledge graph 112 may represent a hierarchically arranged platform in which to manage business data. This platform can be configured to organize and distribute business data for a particular organization. The knowledge graph 112 can function as a repository to be used to structure, simplify, and connect business data to users accessing such data. The data in the knowledge graph 112 may be aggregated from a variety of internal and external sources. In some implementations, the knowledge graph 112 can include metadata 120 that defines a path to obtain a document that may be responsive, e.g., based on a current context, to a particular search query. In this example, rather than store the data in the graph, the information for accessing the data is stored in the graph.

The knowledge graph 112 can access or provide access to a number of repositories including, but not limited to datasets repository 114, measures repository 116, dimensions repository 118, metadata 120 and usage statistics 130, which can be stored internal to the graph 112, external to the graph 112, or both. In general, the knowledge graph 112 may be implemented using any suitable software constructs. In a non-limiting example, the knowledge graph 112 may be constructed using object oriented constructs in which each node is a business object with associated functions and/or variables. Edges of knowledge graph 112 may represent business objects that have associated functions and variables. In some implementations, data contained in the knowledge graph 112 can be constructed of edges and nodes and can be stored in any suitable number of data repositories across one or more servers located in one or more geographic locations coupled by any suitable network architecture. As used herein, a business object refers generally to a construct of data and a methodology regarding how to interact with the data. The knowledge graph 112 can include business object data, metadata, and associating data for such business objects.

In some implementations, the knowledge graph 112 can include query trees configured to connect or be connected to other query trees by edges or nodes. The connections may be based, at least in part, on adherence to system or grammar rules. In some examples, the nodes may represent business objects with a number of functions and variables. The edges may represent similarities between one or more functions or variables associated with at least two business objects connected by at least one edge.

The metadata 120 can include data associated with one or more datasets, measures, and/or dimensions. The metadata 120 may describe semantic enhancements or enrichments to the datasets, measures, and/or dimensions. For example, a dataset can contain metadata that defines time and geography hierarchies, measures, formulas, and calculations, just to name a few examples.

The knowledge graph can include, or have access to, a modifiable grammar 122 and association rules 124 in which to build and update the graph 112, including building and updating nodes 126 in the graph. The grammar 122 may represent a set of association rules 124 (or other rules) that can be used to verify business intelligence semantics stored in the knowledge graph 112. In some implementations, the grammar 122 is located external to query management system 108. For example, the grammar 122 may be included as part of enterprise software application 106 within suggest query 138.

In one example, rules in the association rules 124 (which may also be referred to as system rules, rules, and so forth) can be used to determine how each element of a search query can be connected to other elements (whether included in the query or not) using a specific set of relation types. Relation types can include parent nodes, child nodes, similar nodes based on keyword, business object overlap, business unit overlap, usage history (e.g., included in the usage statistics 130), the dataset statistics 127, etc. The rules can be used to determine a path through the knowledge graph 112 to connect each element of the search query, e.g., to ensure that the system 100 finds and joins conditions that can be performed to execute the query. Another example rule may include specific terms. For example, the keyword "current" may be associated with a rule in the grammar that states that "current" should be followed by an attribute with a time semantic (e.g., "current year" translates to "2015," or the actual current year). In some implementations, the grammar can be used to detect intent and modify particular visualization and/or query suggestion in the user interface 102. For example, a rule can be defined in the association rules 124 for the keyword combination "comparison of" This keyword combination can be associated with a rule that ensures at least two measures are used so that the query management system 108 can generate a bar graph/chart. Another rule may include specifying a drill path or a drill order used to follow a defined hierarchy order (e.g., by year, then by month, etc.).

In some implementations, the dataset statistics 127 may be generated by a data statistics engine 132 within query management system 108. The data statistics engine 132 may be configured to compute a first correlation between a plurality of measures and compute a second correlation between a plurality of dimensions and determine dependencies between the plurality of dimensions. In one example, the correlation can be computed between the plurality of measures using an online Knuth algorithm by performing data shifting to avoid cancellation and loss of precision. In another example, the correlation can be computed between the plurality of measures using a Pearson correlation coefficient.

In some implementations, the data statistics engine 132 can be configured to compute an exception between two or more correlated measures. For example, a context (filter) for which the correlation is not respected anymore may constitute an exception. In some implementations, the data statistics engine 132 can be configured to compute a Pareto distribution for one or more additive measures. For example, when an additive measure (e.g., Revenue) is mainly obtained with few values of one dimension (ex.: 1% Customer makes 81% of Revenue), then a Pareto distribution may show in the data. In some implementations, the data statistics engine 132 can compute an exception of a distribution for one or more dimensions, measures, or filters. For example, when the repartition of an additive measure over a dimension changes significantly when a filter is added on another dimension, an exception may be shown in the data.

In some implementations, the data statistics engine 132 may be configured to compute an entropy of at least one measure by aggregating the measure over one dimension. In response to detecting the entropy above a predefined threshold level, the engine 132 can generate an edge in the knowledge graph from the measure to the one dimension. The predefined threshold level and the entropy can be used to generate one or more data suggestions.

In the example system 100, the query management system 108 also includes a query engine 134 and a security engine 136. In some implementations, the query engine 134 and/or the security engine 136 may be provided external to query management system 108.

The query engine 134 may be configured to generate a number of search queries based on a first correlation and a second correlation determined in the data. For example, correlations determined between measures, between dimensions, or between filters.

A search query, as used herein, can include building a query before actually performing a search for information. For example, query objects may not exist and may be generated in near real time by query engine 134. The generated query objects can then be used to retrieve information from the knowledge graph 112, for example. The retrieved information can be used to build answers to a particular received search query. The answers can be executed against business intelligence data models (e.g., view, dataset, Lumira documents, etc.) and can be displayed as a visualization of data in a user interface.

The query engine 134 can be configured to build and perform queries based on data provided in user interface 102, for example. The data provided in user interface 102 may be system-generated, user-entered, or a combination of both. In some implementations, the query engine 134 can be configured to determine a query context associated with data entered into interface 102 (or with respect to data presented in interface 102). Determining a query context can include using a combination of user entered data and data sources to ascertain context from the user entered data. For example, one way to determine the query context can include accessing a knowledge graph to compare the selected and displayed data from user interface 102 with data (e.g., nodes and edges) in the knowledge graph 112. The comparison can include determining associations between information stored in the knowledge graph and determining which of those associations are compatible with the data displayed in user interface 102.

In operation, the query engine 134 may be configured to generate a number of keyword search queries using one or more keyword tokens that may be generated by receiving user input, such as a free text query or question in a search field. The query engine 134 can execute the keyword searches against a metadata repository and obtain search results responsive to the one or more keyword searches. Using the search results, the query engine 134 can generate several query trees (e.g., one for each token). Using the query trees, the query engine 134 can generate a list of search query suggestions. The query suggestions can be generated using the query trees to retrieve data corresponding to one or more rule compliant data paths defined by the query trees. The query suggestions can be provided to the user for selection. Selecting a query suggestion can trigger execution of a system-wide search for business data.

The security engine 136 can be configured to determine whether a user accessing user interface 102 (and thereby accessing content in query management system 108 and enterprise software application 106) is authorized to access particular data. For example, the security engine 136 can determine whether insufficient security credentials have been provided for a user of the software application. If the engine 136 determines that particular data cannot be accessed, the user interface 102 can be modified to exclude that data. That is, the security engine 136 can remove data from the interface 102 and/or, terminate view access to datasets, measures, dimensions, or any associated business objects.

In some implementations, the security engine 136 may be configured to implement security rules to allow or deny presentation of query suggestions to a user of the user interface, the security rules being based on user usage data, knowledge graph rules, and grammar rules. In some implementations, the security engine 136 may be configured to deny access to one or more query suggestions by removing the one or more query suggestions from a list of generated query suggestions before providing the list to a user. The denied access may be because the security engine 136 determined that insufficient user credentials are associated with the user accessing a user interface in the software application.

In some implementations, the security engine 136 can access information provided by entities wishing to access query management system 108. For example, such information can include security model information, metadata describing sources of such information, and access control list data to be indexed in index 128, for example. In addition, the actual access control lists can also be indexed. For example, the query engine 134 can perform a search query according to user credential rules that allow secure access to a portion of repositories within an organization. The user credential rules may block particular repositories from being searched by the query engine 134 (via application/user interface 102) based on the user's access privileges.

In some implementations, the security engine 136 can be configured to determine an identity of a user accessing user interface 102 to determine historical usage statistics 130 associated with the enterprise software application 106, or query management system 108. The usage metrics (e.g., statistics) 130 may pertain to historical data access, previously suggested queries and/or previously user-edited queries, or a present query combined with the identification of the user. Determining user identification can include retrieving data about the user from login credentials or other repository storing user data. The retrieved data can be used to obtain the user's job title, management statistics, security groups, hierarchy within a group, etc.

Referring again to FIG. 1, the query management system 108 also includes (or has access to) enterprise software application 106. The enterprise software application 106 represents computer software used to satisfy the needs of a business organization. Enterprise software application 106 generally includes a collection of computer programs (i.e., software applications and repositories) with common business applications, tools for modeling how an organization functions, and development tools for building applications unique to the organization. The enterprise software application 106 can be used in combination with query management system 108 to improve enterprise productivity and efficiency by providing business logic support functionality and contextual query resolution.

Services provided by the enterprise software application 106 may include business-oriented tools such as query context management and search query management. Other services are possible including, but not limited to, online shopping and online payment processing, interactive product management, automated billing systems, security, enterprise content management, IT service management, customer relationship management, enterprise resource planning, business intelligence, project management, collaboration, human resource management, manufacturing, enterprise application integration, and enterprise forms automation.

The enterprise software application 106 shown here includes a suggest query service 138 and a knowledge graph API service 140. Both services 138 and 140 can be configured to manipulate user interfaces (such as user interface 102) using stored data from query management system 108. In particular, the suggest query service 138 can transform a user query or question (suggested, or otherwise) into query descriptions over existing datasets and artifacts in enterprise software application 106 and/or query management system 108. An associated query service (not shown) can function to retrieve data corresponding to the suggested query and used to provide visualization of the data to a user. A visualization recommendation service (not shown) can be used to determine how a suggested query could be properly visualized in a user interface. The suggested queries may be based on information stored in the knowledge graph 112. The knowledge graph 112 may be built from information that can be crawled from various data sources, or derived from usage.

The knowledge graph API service 140 can be provided to a number of entities that wish to utilize query management system 108 and enterprise software application 106. Entities can push information to the knowledge graph 112 by sending information on a message bus. For example, to insert data into the knowledge graph 112, entities can send security model information, metadata describing the sources of information, and access control list data to be indexed, as well as the access controls lists. In some implementations, the entities (e.g., source systems) may decide which information should be sent, and to what extent dimensions can be indexed. Information sent over the bus can be collected by dedicated collectors (not shown) that can store such information in the knowledge graph 112. The collectors may be deployable independently of one another to make scaling and graph updating convenient.

The query management system 108 in system 100 can be communicatively coupled to client device 104. Client device 104 can access query management system 108 and any associated software applications. Client device 104 can be connected (wired or wirelessly) to system 108, which can provide business data, user interfaces, and facets for display. In some implementations, the client device 104 can execute one or more applications on the query management system 108 and provide business content and/or services to client device 104.

In some implementations, one or more additional content servers and one or more computer-readable storage devices can communicate with the client device 104 and query management system 108 using network 110 to provide business content to the devices hosting client device 104 and query management system 108. In some implementations, the network 110 can be a public communications network (e.g., the Internet, cellular data network, dialup modems over a telephone network) or a private communications network (e.g., private LAN, leased lines). In some implementations, the client device 104 and query management system 108 can communicate with the network 110 using one or more high-speed wired and/or wireless communications protocols (e.g., 802.11 variations, WiFi, Bluetooth, Transmission Control Protocol/Internet Protocol (TCP/IP), Ethernet, IEEE 802.3, etc.).

Although only two computing devices are depicted in FIG. 1, the example system 100 may include a plurality of computing devices that can exchange data over a network 110 (or additional networks not shown). The computing devices hosting query management system 108 and enterprise software application 106 may represent clients or servers and can communicate via network 110, or other network. Example client devices may include a mobile device, an electronic tablet, a laptop, or other such electronic device that may be used to access business content from query management system 108. Each client device can include one or more processors and one or more memory devices. The client devices can execute a client operating system and one or more client applications that can access, control, and/or display business data on a display device included in each respective device. The query management system 108 may represent a server device. In general, the query management system 108 may include any number of repositories storing content and/or business software modules that can search, generate, modify (e.g., edit), or execute business software and associated business objects, data, and knowledge graphs.

Additional devices are possible and such devices may be configured to be substituted for one another. In some implementations, a client device 104 and the query management system 108 can be laptop or desktop computers, smartphones, personal digital assistants, portable media players, tablet computers, gaming devices, or other appropriate computing devices that can communicate, using the network 110, with other computing devices or computer systems.

In operation of system 100, a user can pose a query/question in interface 102 and receive one or more answers in the form of raw data, visual/graphical data, and/or other data format. The answers can be provided by query management system 108. In a non-limiting example, the query management system 108 can build a set of consistent queries using rich business intelligence semantic information, syntactic keyword rules, combination rules, security rules, dataset statistics and/or usage statistics and can do so with near real time performance.

In short, the query management system 108 can receive textual data from a user accessing interface 102 and can use the query to access the grammar 122. The query management system 108 can use the grammar 122 and the received data to generate a set of consistent queries. The text in the data can be analyzed and tokenized (i.e., portioned into tokens), and associated to keywords if a matching textual query portion can be found in the grammar. In some implementations, the matching can be performed using a Levenshtein distance algorithm to resist account for typing errors. Other approximating algorithms can of course be substituted. The query management system 108 can attempt to match each token (including keywords) against the metadata using a full text search engine, such as query engine 134 or an external search engine. The matches can be combined using predefined association rules (e.g., association rules 124) as a default. In some implementations, the rules may include particular rules associated with the received/detected keywords. Combining the matches can include generating a tree/graph in which nodes 126 of the graph 112 represent matched metadata or keywords item, (or a node to mark a non-matched item). A new node can be added as a child node if an existing node satisfies the applied rules.

Upon applying the rules, the query management system 108 can select a number of generated queries that appear to be within the same context and relevancy as the user entered textual data (i.e., by analyzing the score). The suggested queries can be translated to a human readable format and translated to a query that can be accessed by query service 138, for example. The translation can be performed using the grammar keywords to express the interpreted semantic. The human readable format of the suggested queries can be provided to the user of interface 102, while the machine-readable query can be provided to suggest query service 138. The user can select which query suits his needs.

In general, a path from the root of the graph 112 to a leaf may represent a query that has been judged consistent by the system 100. The above process can be used to generate several consistent queries that can be scored using a cumulative search score for each individual item, where the cumulative search score can be based rules (such as described herein), the dataset statistics 127 and/or the usage statistics.

The system 100 can provide the advantage of an easy to use full text search to generate consistent queries/query objects without user action. The queries may be expressive of data in repositories and include keyword and grammar support. In addition, the system 100 can provide the advantage of ranking such queries. The system 100 may also be fault tolerant with respect to typing and semantic errors. The system 100 may provide incremental learning for a user because the user can reuse keywords presented in previous query suggestions that the user received.

Figure 2:
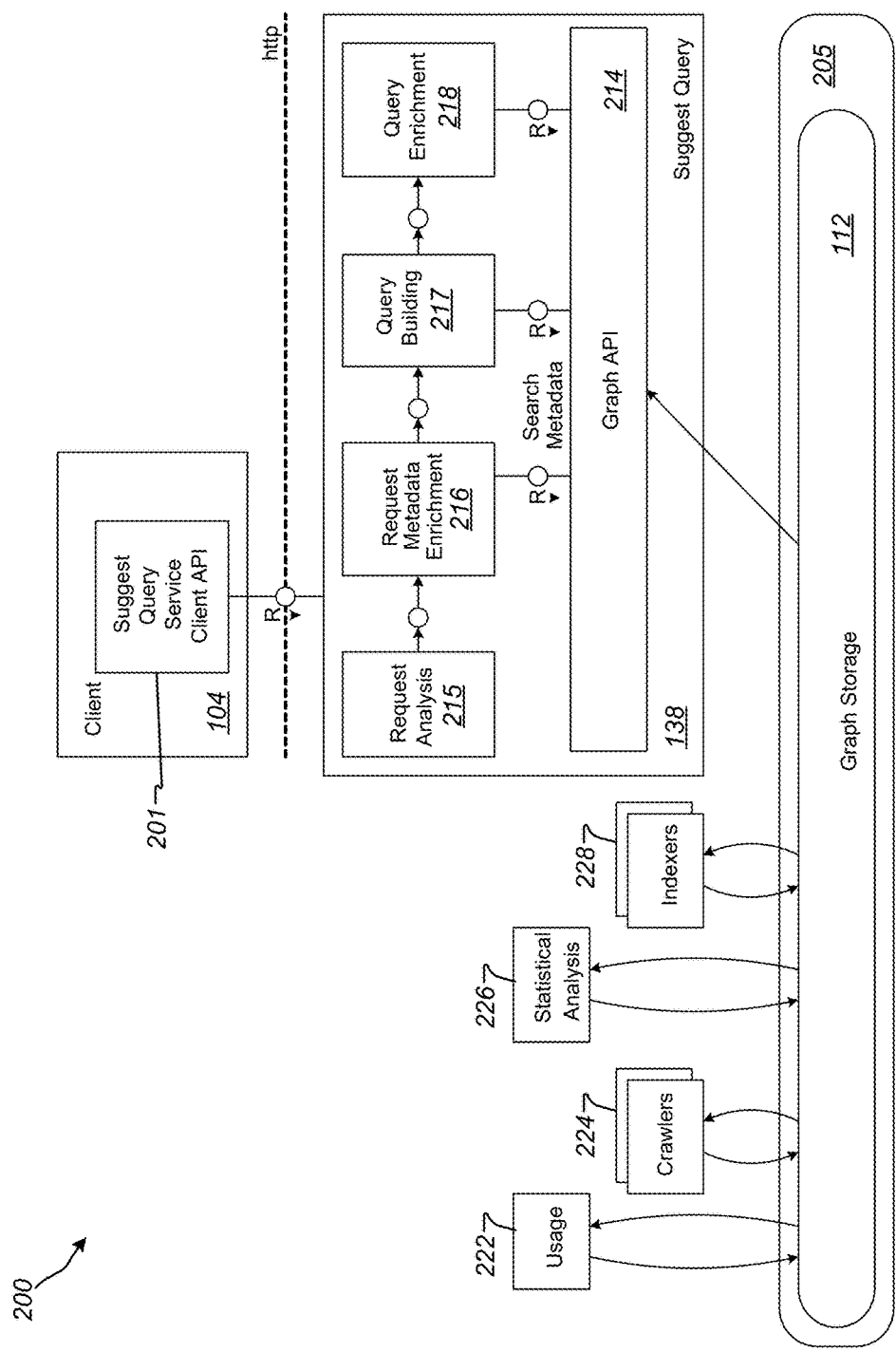
FIG. 2 is a block diagram illustrating an example query suggestion and completion system that can be implemented in the system of FIG. 1.

FIG. 2 is a block diagram illustrating an example query suggestion and completion system 200 that can be implemented in the system 100 of FIG. 1. Accordingly, for purposes of illustration, the system 200 is illustrated as including elements of the system 100, and FIG. 1 will be referenced, as appropriate, in the discussion of FIG. 2.

In an implementation, the system 200 can assist a user in composing (building) a query string to be executed on one or more dataset included in a database 205, where information about the datasets can be maintained in a knowledge graph, such as the knowledge graph 112 discussed above and shown, for purposes of illustration, in FIG. 2. In other implementations, the system 200 can be used to assist a user in building a query that is to be executed on datasets that are stored in a database system having a configuration other than those described herein. Briefly, the system 200 can be used to determine a current user-context (such as user-contexts as described herein), identify query parameters (e.g., measures, dimensions and/or filters) related to that user-context, provide suggestions for building a query that are consistent (e.g., as determined using the scoring techniques described herein) with the user-context and provide suggested related data visualizations based on the user-context and an executed and/or edited query.

As shown in FIG. 2, the system 200 includes the client device 104, the suggest query service 138 and graph storage 212, which can be implemented as, at least a portion of, the knowledge graph 112 of the system 100. As illustrated in FIG. 2, graph storage 212 can be included in a database 205, which can take a number of forms, such as an in-memory database, a distributed database, or other database configuration. The client 104 in the system 200 includes a suggest query service client API 201, which can be configured to communicate with the suggest query service 138 to build a query string based on a current user-context and/or provide related visualization suggestions based on the current user-context. Likewise, the suggest query service 138 of FIG. 2 includes a graph API that can be configured to communicate with graph storage 212 to provide query suggestions and related visualization suggestions (e.g., in conjunction with the suggest query service client API 201).

In FIG. 2, the suggest query service 138 is illustrated as including a request analysis service 215, a request metadata enhancement service 216, a query building service 217 and a query enrichment service 218. The request analysis service 215 analyzes and tokenizes the textual user input, and associates some tokens to keywords if a matching textual query portion can be found in the grammar 122. The request metadata enhancement service 216 attempts to associate each token with a list of matching metadata 120 or data contained in index 128, using a suitable search engine. In some implementations, the matching can be performed using a Levenshtein distance algorithm to account for typing errors. Other approximating algorithms can, of course, be substituted. The query building service 217 combines the measures, dimensions and/or filter values determined by 216 into a plurality of query suggestions, and selects the most suitable suggestions, according to rules, usage statistics or data statistics. The query enrichment service 218 further enhances the suggestions created by service 217 by adding compatible measures, dimensions or filters that could be of interest given the user context, for further exploration of the dataset. In an implementation, the request analysis service 215, the request metadata enhancement service 216, the query building service 217 and the query enrichment service 218 can be used to implement the methods of FIGS. 3 and 5, which are discussed below. For instance, these elements of the query suggest service 138 can be configured to provide query suggestions and/or suggest related data visualizations, where those determinations can be based on the usage statistics 130 in combination with a current user-context. In such an approach, the usage statistics 130 can be used to compute numerical scores to rank the relevance of each of a plurality of query parameters that may be relevant to a user based on a current user-context.

In some implementations, suggestions (query completion and related visualization suggestions) can be also be based on other scores (e.g., other ranked numerical scores), such as rule-based scores and/or dataset statistic based scores, where such other scores can also be based on the current user-context. In such implementations, different (ranked) scores for a given set of possible suggestions can be merged (blended, combined, etc.) to produce a single set of ranked numerical scores for the given set of possible suggestions. The suggest query service 138 can then make suggestions to a user (e.g., on the user interface 102 of the client 104 via the suggest query service client API 201) for building a query and/or for a data visualization that is (are) consistent with (relevant to) the current user context, where the suggestions are based on such ranked scores (usage based scores, or otherwise).

As shown in FIG. 2, the system 200 also includes a usage metrics service 222, a crawler service (crawlers) 224, a statistical analysis service 226 and an indexer service (e.g., indexers) 228. In the system 200, usage metrics service 222 can be configured to communicate with graph storage 212 to collect and maintain usage statistics (such as those described herein) for data that is included in a knowledge graph. The crawlers 224 can be configured to extract (determine, etc.) metadata from the datasets 114 and store them in the graph storage 212. Such metadata can include dimensions, measures and default aggregation functions corresponding with data stored in the datasets 114. The metadata generated by the crawlers 224 can then be stored in the graph storage 212. The statistical analysis service 226 can be configured to determine a set of statistics based on data included in datasets of the graph storage 212. Such statistics can include correlations (symmetric and asymmetric) between dimensions and/or measures, determinations of whether measures are "continuous" or "discrete", cardinality, minimums, medians, maximums, identification of Pareto distributions, etc. The indexers 228 can be configured to index different sets of values of dimensions for datasets of the graph storage 212, so that those dimension values can be quickly retrieved from the graph (e.g., for responding to a query and/or for providing a query suggestion).

Figure 3:
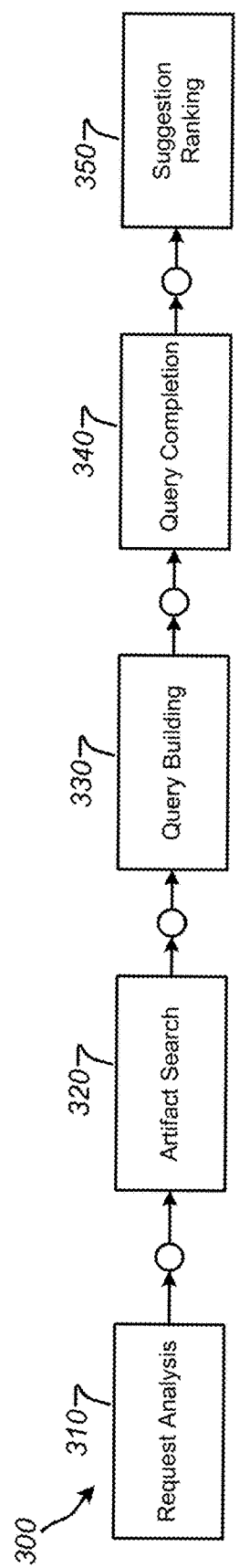
FIG. 3 is a flowchart illustrating an example method for query suggestion and completion.

FIG. 3 is a flowchart illustrating an example method 300 for query suggestion and completion. The method 300 can be implemented in the systems 100 and 200 of FIGS. 1 and 2. Accordingly, for purposes of illustration, the method 300 will be described with further reference to FIGS. 1 and 2, as appropriate. It will be appreciated, however, that the method 300 can be implemented in systems having other configurations than those shown in FIGS. 1 and 2.

As illustrated in FIG. 3, the method 300 can include, at block 310, a request analysis. The request analysis at block 310 can be triggered by a given user accessing (logging into) the enterprise software application 106 (e.g., via the user interface 102) and entering textual input of at least a portion of a question (query) about datasets included in or represented by the graph storage 212 (the knowledge graph 112). During the request analysis at block 310, the query suggest service can determine a current user-context, such as determining a user identifier (user ID), the user's job function, business groups and/or hierarchies the user is associated with and/or the textual input received from the user. In addition, the request analysis at block 310 analyzes the text entered by the user, splits the text into tokens, and recognizes grammar keywords.

At block 320, an artifact search is performed in response to the request analysis. The artifact search at block 320 can include using the index 128 to determine for each token from the textual input of the users a number of measures, dimensions and/or filter values whose names or descriptions match perfectly or partially the token. At block 330, the method 300 includes a query building process. The query building process can include combining the measures, dimensions and/or filter values determined by block 320 into a plurality of query suggestions. At block 340, the method 300 includes a query completion process. The query completion process at block 340 can include adding other measures, dimensions and/or filter values to the query suggestions provided at block 330 to make sure that they can be turned into executable queries. These additions can be determined by following some of the association rules 124. They can also be determined using information provided by the statistical analysis service 226, and/or using usage statistics 130. They can also be determined thanks to the user context and/or previously executed or edited queries in the system 200 (such as previous queries associated with the current user or other users the current user is connected with based on the determined user context). At block 350, the method 300 includes a suggestion ranking process. The suggestion ranking process at block 350 can include associating with each completed query a numeric score and ordering the completed queries according to their scores.

Figure 4A:
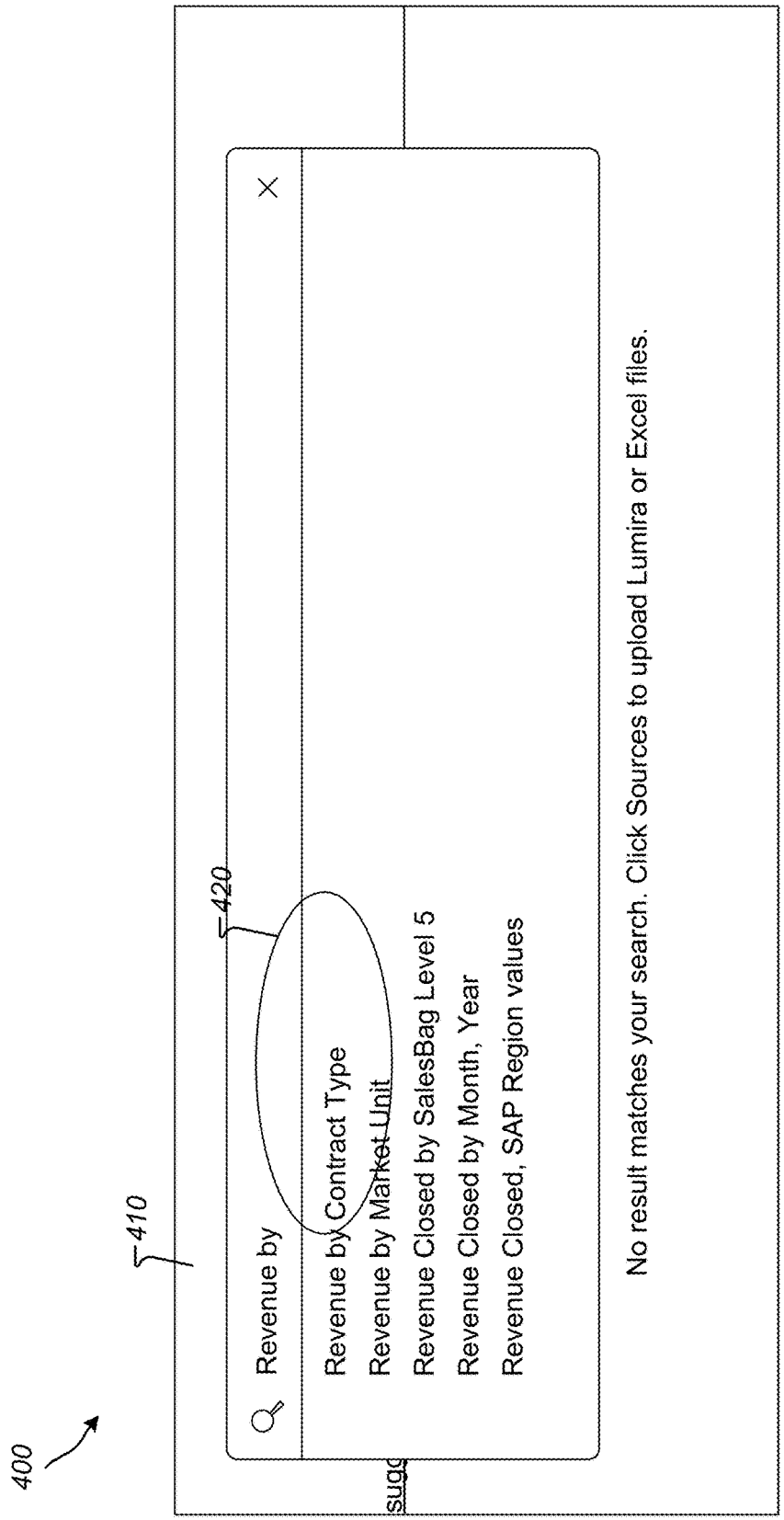
FIGS. 4A and 4B are screenshots illustrating an example of query completion suggestions.
Figure 4B:
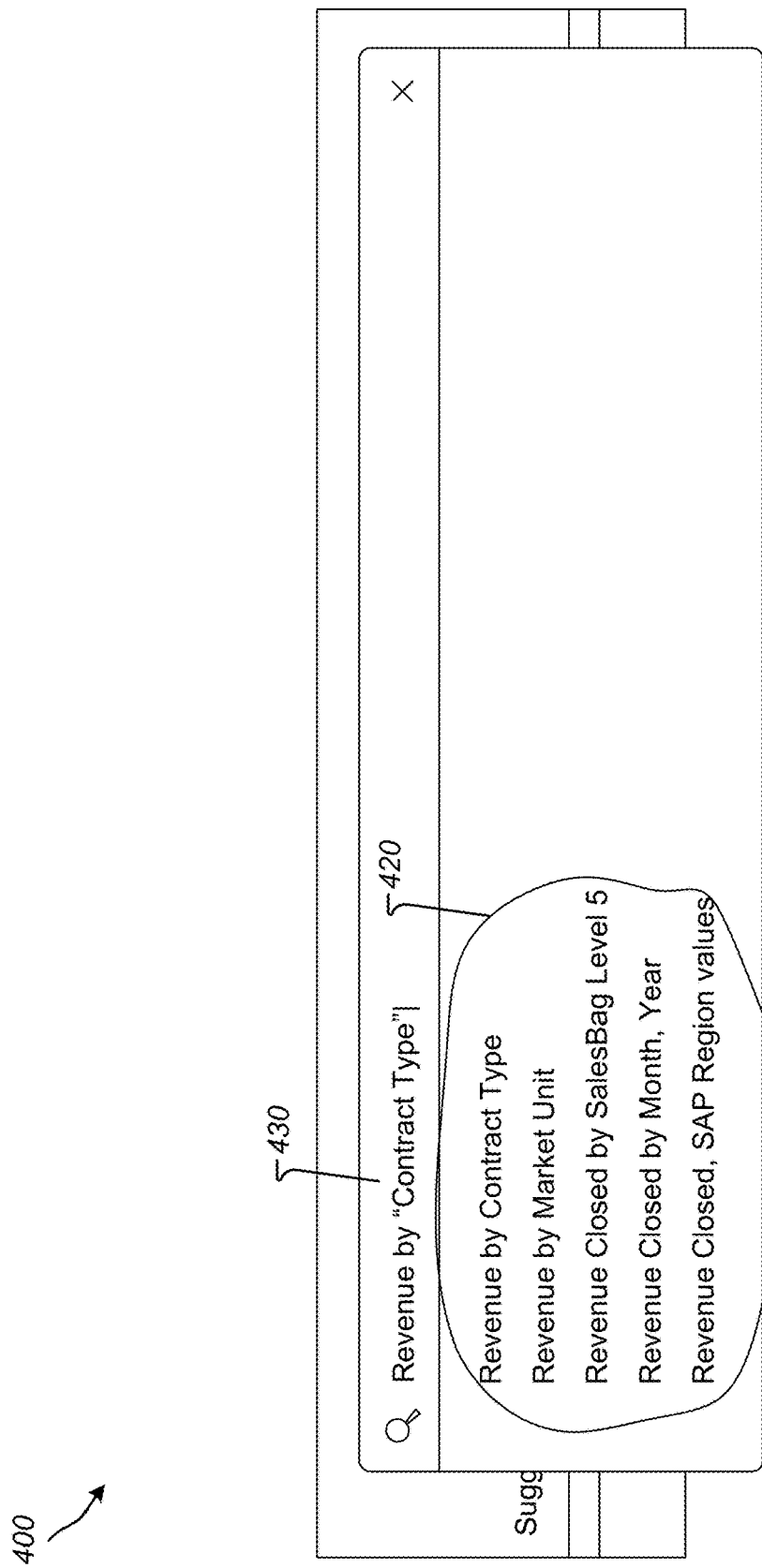

FIGS. 4A and 4B are screenshots of a user interface 400 illustrating an example process of using query suggestions for query completion. The user interface 400 can implement query completion suggestions that are made using the method 300, such as when implemented by the systems 100 and/or 200. Accordingly, for purposes of illustration, the user interface in FIGS. 4A and 4B will be described with further reference to FIGS. 1-3, as appropriate. It will be appreciated, however, that the user interface 400 can be implemented in systems having other configurations than those shown in FIGS. 1 and 2 and/or using query completion and suggestion methods other than the method 300.

Referring to FIG. 4A, the user interface 400 is illustrated showing that a current user has entered the query terms (parameters, etc.) "Revenue by" as query string 410 (e.g., a dimension parameter with an expected measure to follow). Using the approaches described herein, the suggest query service 138 can generate query completion suggestions 420 based on a current user-context, including the entered query string 410, usage metrics, dataset statistics and/or rules, such as those described herein. For instance, the suggest query service 138 may determine measures, other dimensions and/or filters that are considered relevant to the query string 410 based on the current user-context and scores (e.g., usage metric scores, dataset statistics scores and/or rule-based scores) for query parameters that are identified as being related to the query string 410 by, for example, an artifact search at block 310 of the method 300. The ranked suggestions, such as those produced at block 350 of the method 500 can then be displayed to a user (e.g., in the user interface 102 of the client 104) as query completion suggestions 420.

Referring to FIG. 4B, the user interface 400 is illustrated after selection (e.g., by the current user) of a suggestion from the query completion suggestions 420. Specifically, in FIG. 4B, the query string 410 of FIG. 4B has been modified to query string 430 to include the selected suggested measure of "Contract Type" for a query string 430 of "Revenue by 'Contract Type.'" In the query string 430, the selected measure may be displayed in quotes to illustrate that "Contract Type" was selected from the query completion suggestions 420 made by the suggest query service 138. While not shown in FIG. 4B, in some implementations, the query completion suggestions 420, after selection of the measure "Contract Type", can be modified based on the addition of the selected measure to the current user-context.

FIG. 5 is a flowchart illustrating an example method 500 for suggesting data visualizations based on a user query string (e.g., user entered and/or completed using query suggestions). As with the method 300 of FIG. 3, the method 300 can be implemented in the systems 100 and 200 of FIGS. 1 and 2. Accordingly, for purposes of illustration, the method 500 will be described with further reference to FIGS. 1 and 2, as appropriate. It will be appreciated, however, that the method 500 can be implemented in systems having other configurations than those shown in FIGS. 1 and 2.

The method 500, at block 510, includes a user entering a query string and the suggest query service 138 generating a list of query suggestions, such as using the approaches described herein. In response to the entry of a query string and generation of query suggestions at block 510, the method 500 can include, at block 520, finding related query suggestions that are stored in graph storage 212 using the approaches described herein. Also in response to the entry of a query string and generation of query suggestions at block 510, the method 500 can include, at block 530 and in parallel with block 520, finding related query suggestions using statistics, such as a usage metrics and/or dataset statistics. At block 540, the related query suggestions found at block 520 and block 530 can be combined into a single related query suggestions list. At blocks 550, 560 and 570, the query suggestions of the related list of block 540 can be scored based on the current-user context and, respectively, usage metrics (block 550), dataset statistics (block 560) and/or rules (block 570). At block 580, the scores for the list of related query suggestions of block 540 from blocks 550, 560 and 570 can be merged into respective aggregate scores for each of the related query suggestions. At block 590, the list of related query suggestions can be ordered based on the respective aggregate scores. Visualizations of the related suggestions can then be presented to a user based on the ordered list of block 590.

Figure 6:
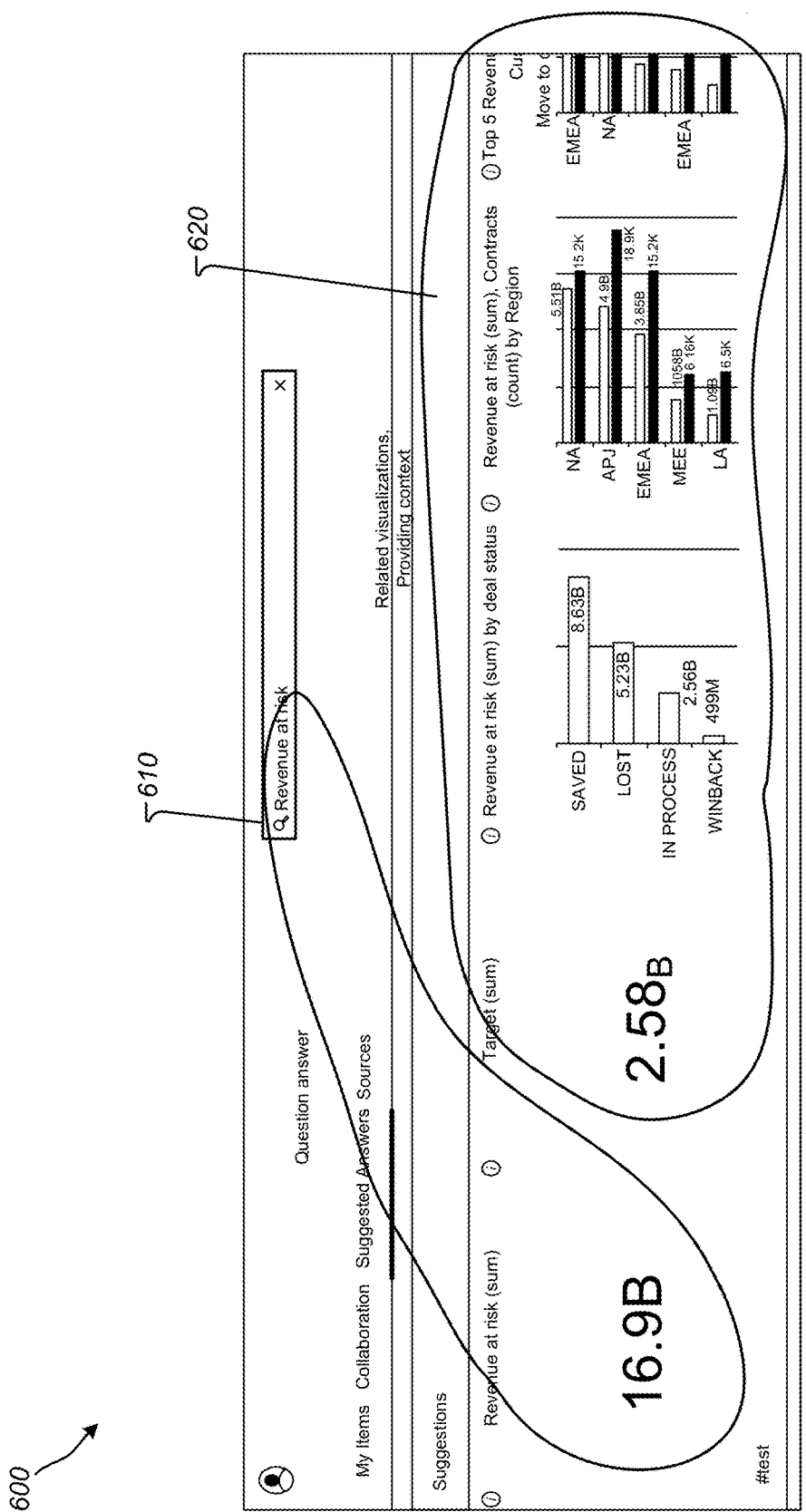
FIG. 6 is a screenshot illustrating suggested data visualizations based on a user query.

FIG. 6 is a screenshot of a user interface 600 illustrating suggested data visualizations based on a user query and current user-context. The suggested data visualizations provided in the user interface 600 can be provided, for example, based on an ordered, scored list of related query suggestions produced using the method 500. As illustrated in highlight 610 in FIG. 6, a user may enter a query string of Revenue at Risk and a direct answer to that query string (a sum of 16.9 B) can be shown in the user interface 600. Further, in the highlight 620 in FIG. 6, various visualizations of the related suggestions (e.g., relevant to the current user-context, including the entered query string) may be presented. In this example, a target value (sum) for Revenue at Risk of 2.58 B, a graph of Revenue at Risk by Deal Status and a graph of Revenue at Risk and Contracts by Region are shown. These related visualizations may be presented based on an ordered list of related suggestions, such as a list produced at block 590 of the method 500. In an implementation, a user can select one of the presented related visualizations to get more information on that view of data from one or more datasets corresponding with graph storage 212.

Figure 7:
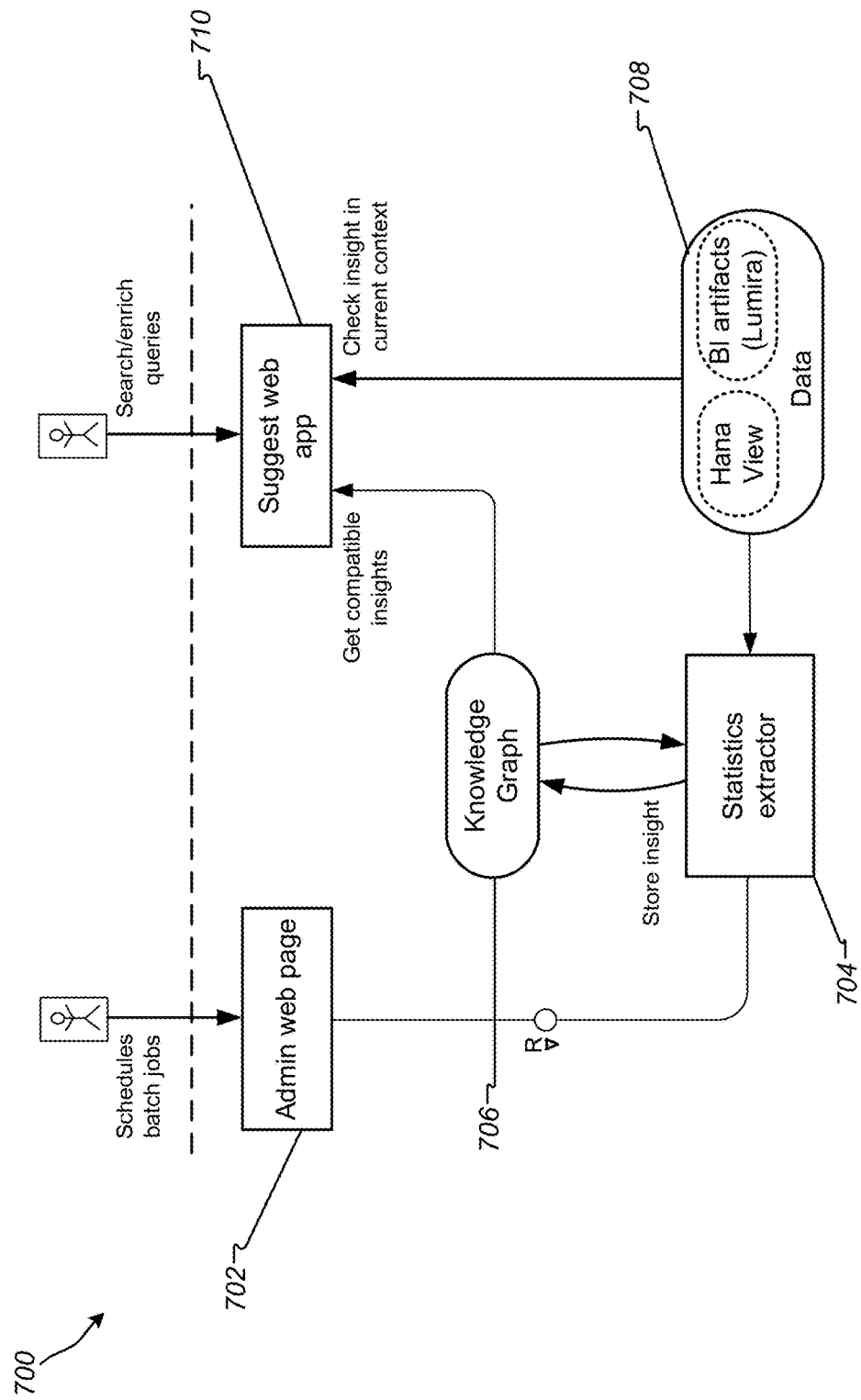
FIG. 7 is a block diagram depicting an overview of example components used with statistical analysis techniques described herein.

FIG. 7 is a block diagram 700 depicting an overview of example components used with statistical analysis techniques described herein. The components include an admin web application 702, a statistics extractor 704, a knowledge graph 706, a database 708, and a suggest web application 710. The admin web application 702 may allow an administrator to schedule statistical analysis. The statistical analysis can be automatically executed at the scheduled times by the statistics extractor 704. The statistics extractor 704 can use metadata from the knowledge graph 706 and data from the database (Hana View, Lumira artifact, etc.) 708 to compute statistics. In general, information and metrics and patterns found by the statistical analysis are stored in the knowledge graph 706. At a later time, the suggest web application 710 can access and use the stored statistics and to validate them at runtime.

Figure 8:
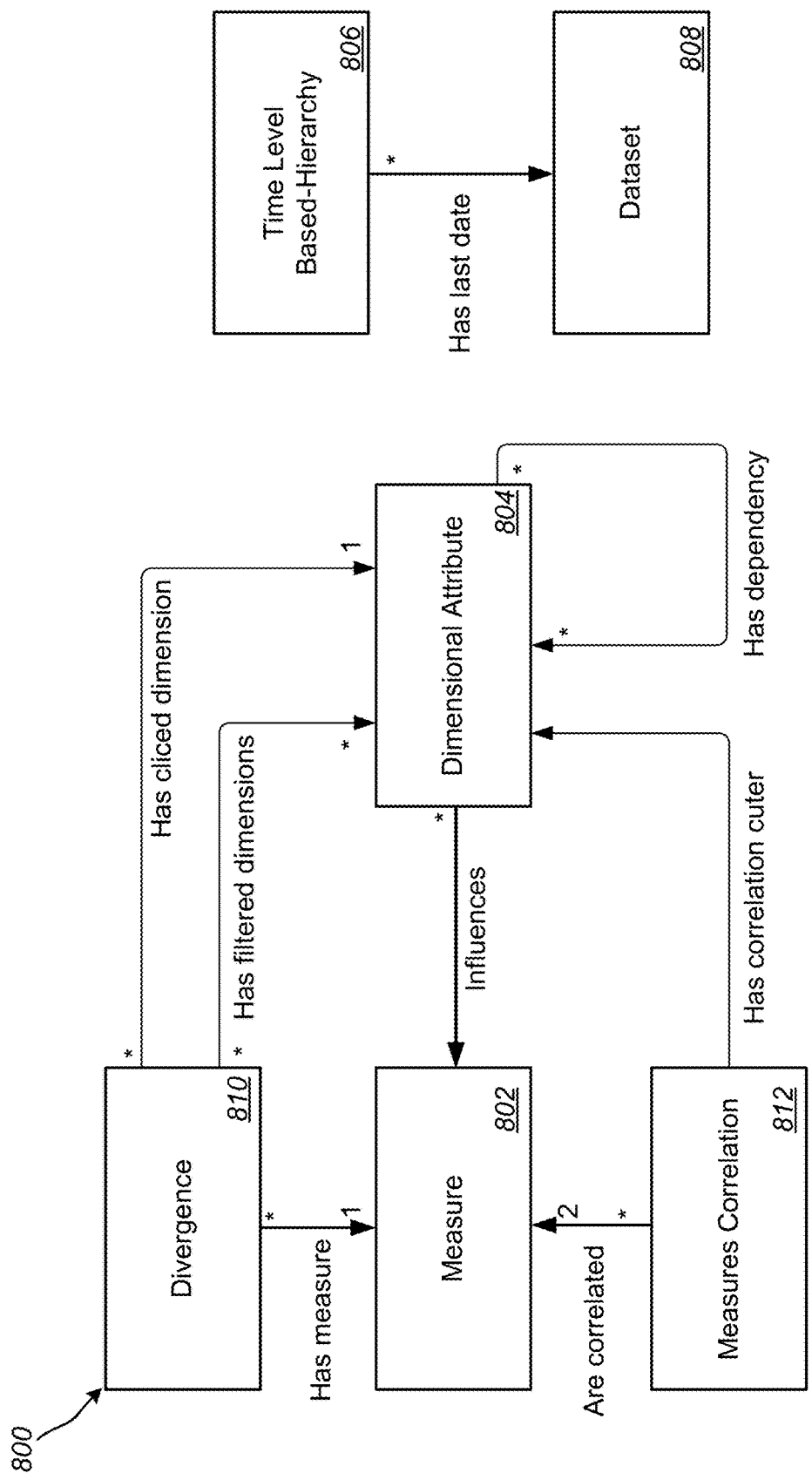
FIG. 8 is an example block diagram illustrating statistics modeling in a knowledge graph.

FIG. 8 is an example block diagram 800 illustrating statistics modeling in a knowledge graph. The modeling components represent vertices and include measures 802, dimensional attributes 804, time level based hierarchies 806, and datasets 808. The modeling components also include divergence data 810, and measures correlations 812. The measures 802, dimensional attributes 804, time level based hierarchies 806, and the datasets 808 represent metadata already present in the knowledge graph when a particular statistical analysis begins (e.g., datasets, dimensions, measures, hierarchies). The edges shown in the diagram 800 and the other vertices (divergence data 810 and measures correlations 812)) represent different metrics and patterns that have been found by the statistical analysis (e.g., relationships between measures and dimensions that influence particular measures, the measures or dimension correlations and their exceptions, the distribution exceptions (divergence data 810)).

FIGS. 9A-9F illustrate example processes of detecting and analyzing metrics and patterns that are detected and stored in a knowledge graph. The processes can obtain insights from a suggest service by computing statistical metrics (e.g., dataset statistics 127, usage statistics 130) on detected data and/or patterns in the system 100, for example. In some implementations, statistical analysis can be performed by a statistical extractor (e.g., statistical extractor 704 in FIG. 7) that is part of query management system 108. The statistical analysis is generally executed after a knowledge graph is generated by the crawlers 224, but may be performed before indexation. Each metric determined in the statistical analysis can be persisted in the knowledge graph so that other serveries can leverage the metrics at a later point in time. In addition, such metrics can be stored and verified as valid within particular contexts, in the event that the context is changed in a particular database or visualization.

The systems described herein can perform a batch analysis of a dataset. The analysis may result in finding information about the dataset to support natural query variants. For example, the system can find structural dependencies between dimensions (e.g., hierarchical drill paths) and/or find correlation between measures. In some implementations, the analysis may result in finding combinations of dimensions and measures that may contain interesting information for the user based at least in part on the user's current query context. In one example, Pareto distributions can be determined. In particular, high entropy can be determined in an example in which 20% of customers generate 80% of the revenue. This can be further drilled down to determining that the 20% metric depends on time, geographical region or other user-applied filter. In another example, patterns and exceptions to patterns can be found.

Figure 9A:
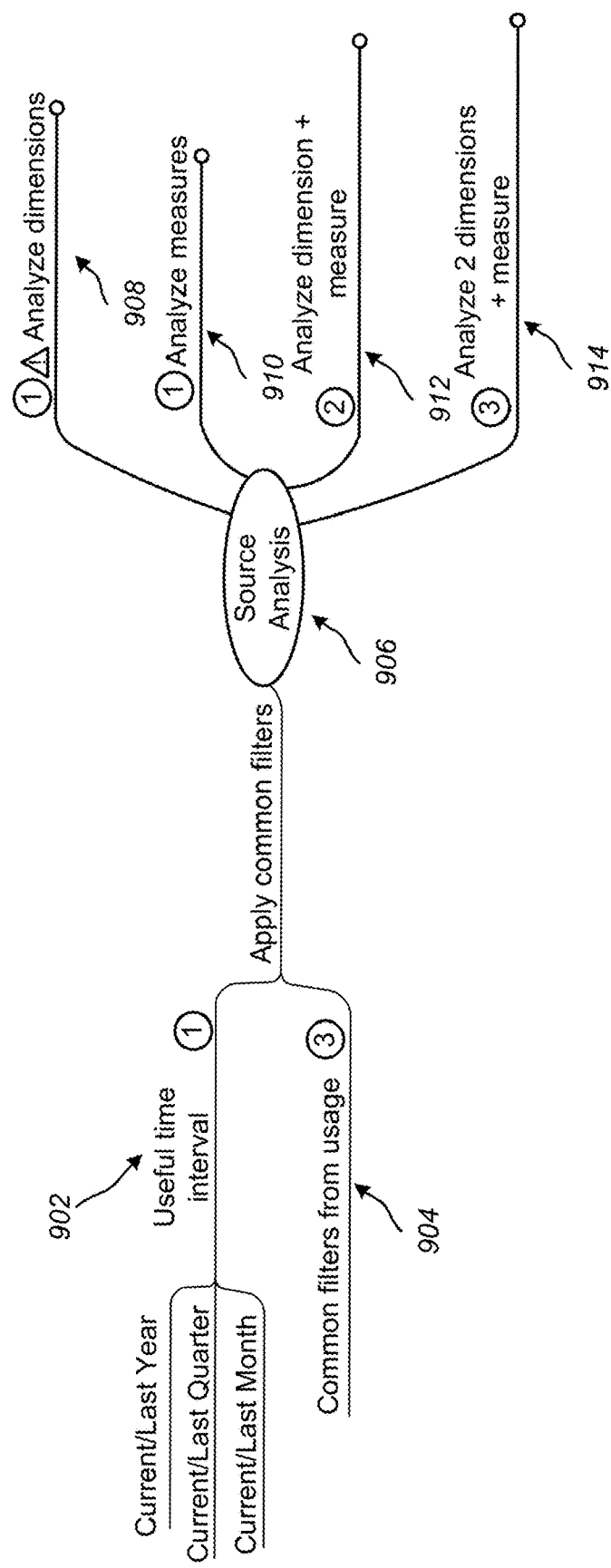
FIGS. 9A-9F illustrate example processes of analyzing metrics and patterns that are detected and stored in a knowledge graph.

Referring to FIG. 9A, a time period can be defined using a current/last year, quarter, and/or month 902 as a useful time interval 902 and/or common filters can be applied according to user usage data 904. The time period 902 and filters and/or usage data 904 can be applied when performing source analysis 906. The source analysis 906 can include analyzing dimensions 908, analyzing measures 910, analyzing dimensions and measures 912, and/or analyzing two dimensions and one measure 914.

Figure 9B:
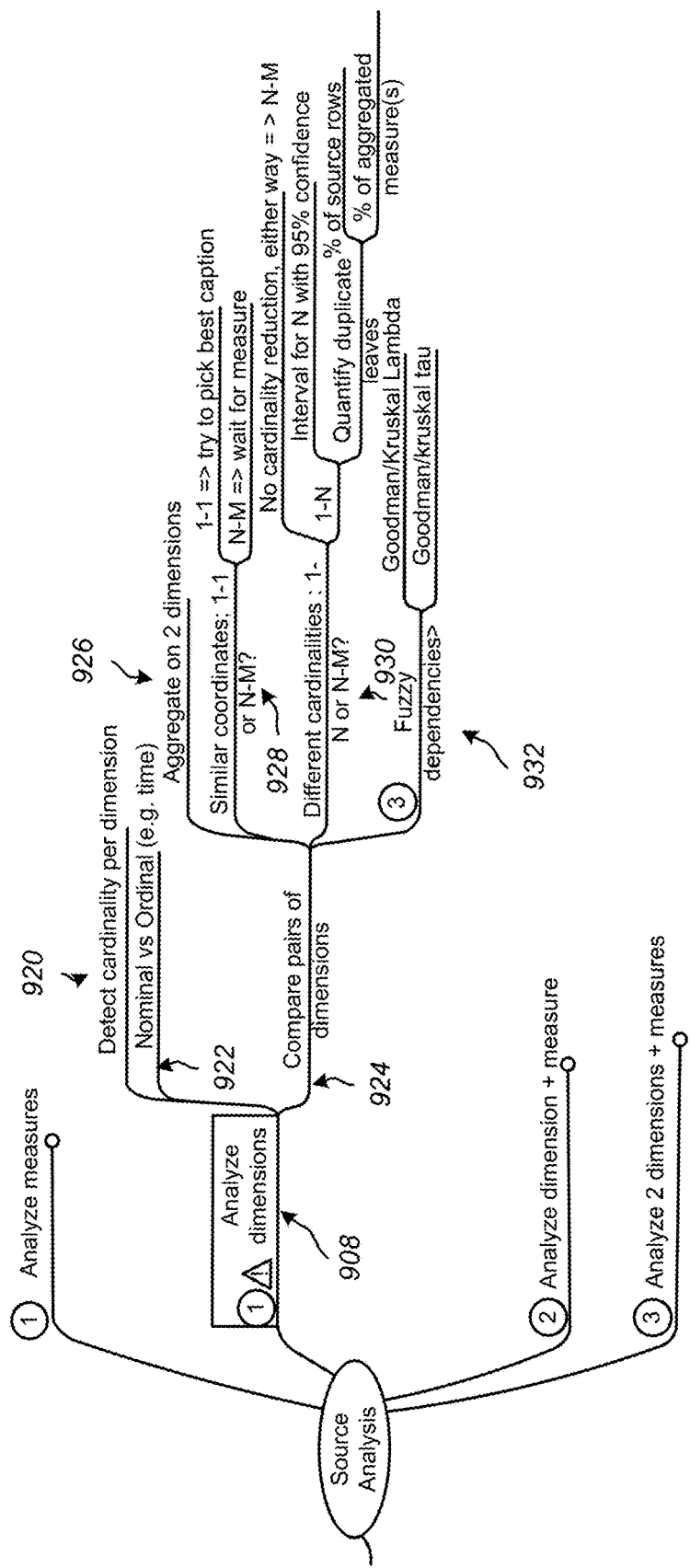

Referring to FIG. 9B, analyzing dimensions 908 can include computing inter-dimension correlations to find dependencies between particular dimensions. If an inter-dimension correlation is found, an edge is added (as DependencyEdge) in the knowledge graph between the two dimensions. The dimensions may be oriented from less granular to more granular dimensions (e.g., from country to city). Such an edge may have two properties (1) strength and (2) fanout. The strength may be used to evaluate how strong a dependency is (e.g., mean perfect dependency, actual hierarchy, etc.). The fan-out may be used to evaluate cardinalities after drilling. Information gathered when analyzing dimensions can be used to suggest drill-paths and to compute other metrics (e.g., 2 dimensions+1 measure analysis and divergences).

As shown in FIG. 9B, the analysis can include detecting cardinality per dimensions 920, determining a metric (e.g., time) as nominal versus ordinal 922, and comparing pairs of dimensions 924. Comparing pairs of dimensions 924 can include aggregating on two dimensions 926, computing similar cardinalities 928, computing different cardinalities 930, and determining fuzzy dependencies 932. Determining similar cardinalities 928 can include attempting to select a best caption and waiting for a measure to determine whether similarities apply. Determining different cardinalities 930 can include determining that there is no cardinality reduction, determining that an interval for one dimension is different than another with 95% confidence, and/or quantifying duplicate leaves in the knowledge graph. Determining fuzzy dependencies 932 can include employing Goodman/Kruskal Lambda or Kruskal Tau algorithms.

Figure 9C:
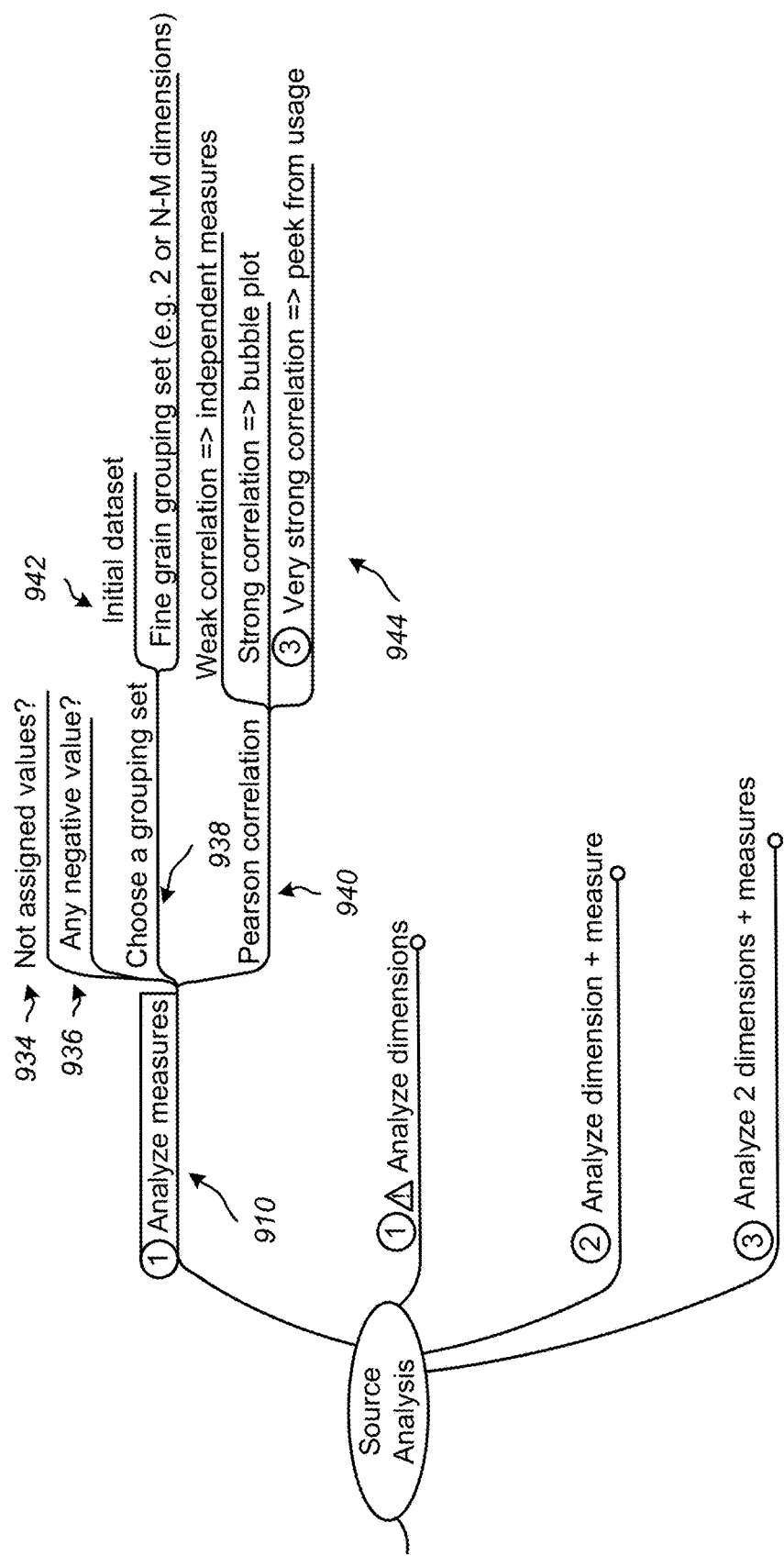

Referring to FIG. 9C, analyzing measures 910 can include computing correlations between particular measures, using a Pearson correlation coefficient, for example. In another example, the measure correlation can be computed in a single pass using a Knuth algorithm and data shifting to avoid cancellation and loss of precision. For each pair of correlated measures, the systems described herein can create a vertex of correlated measures (e.g., MeasuresCorrelation) linked by two edges (e.g., CorrelationEdge) between the correlated measures. The vertex may have a property that contains the Pearson coefficient with double precision, for example. The measure correlation may be used to suggest a related visualization with additional relevant measures or to avoid suggesting two measures that are perfectly correlated.

In some implementations, a modified Thompson Tau technique can be used to compute correlation outliers. For example, the modified Thompson Tau technique can include using linear regression and Tau (computed from T critical values). Any determined outliers can be stored in the knowledge graph in the form of a CorrelationOutlierEdge. This edge may have the property which contains values for which outliers are found. The technique can be used to suggest a related visualizations with the measure sliced by the dimensions and with a filter to keep only the values of the dimension in the CorrelationOutlierEdge from the graph.

As shown in FIG. 9C, analyzing measures 910 includes any or all of determining unassigned values 934, negative values 936, selecting a grouping set 938, and/or determining a Pearson correlation between measures 940. Selecting a grouping set may include selecting an initial dataset and/or selecting a fine grain grouping set 942 (e.g., 2 or 3 N-M dimensions). Determining the Pearson correlation of measures 940 can include determining a weak (e.g., independent measures), strong (bubble plot), or very strong (peek from usage) correlation 944.

Figure 9D:
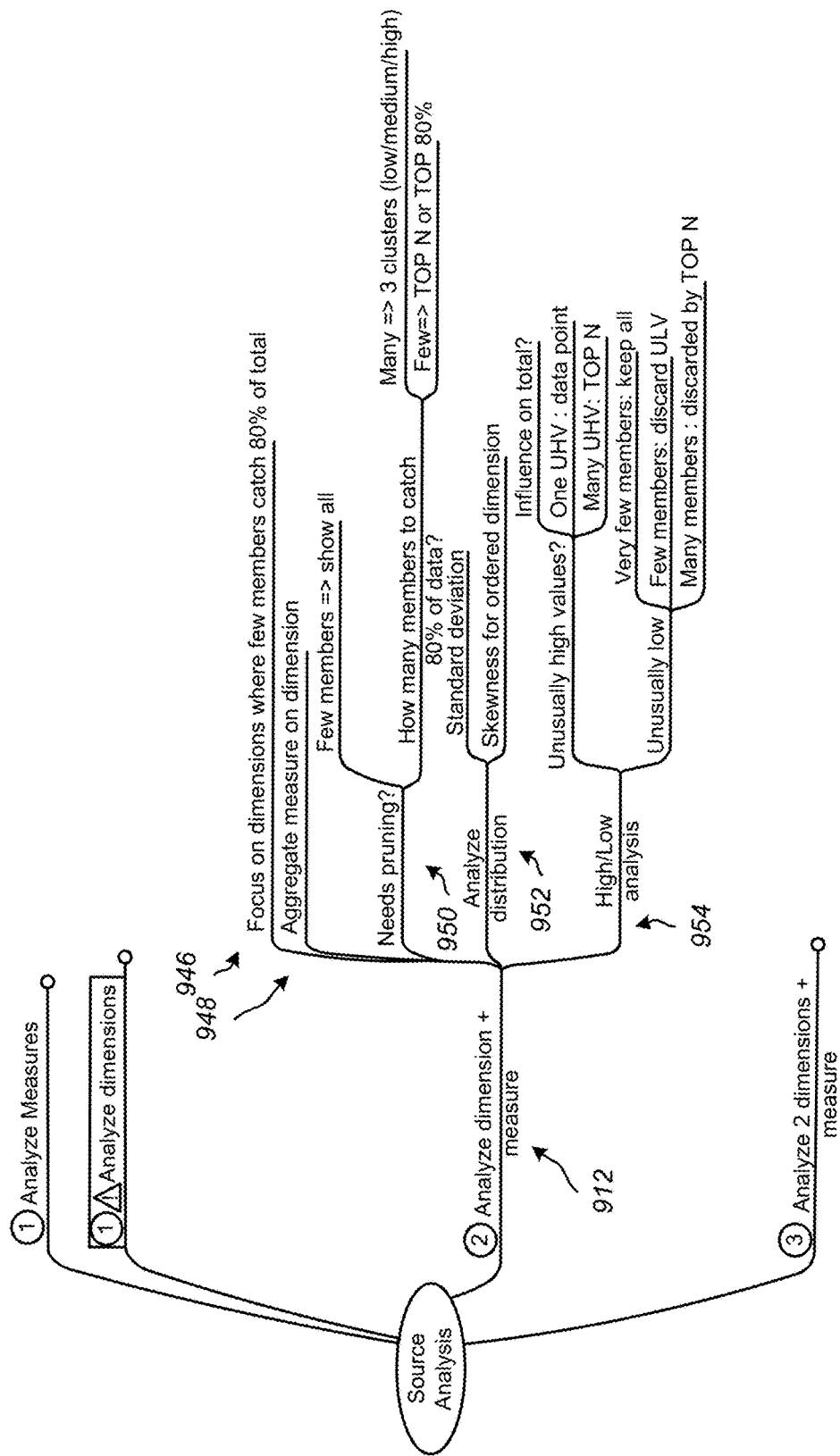

Referring to FIG. 9D, analyzing one dimension and one measure 912 can include computing entropy of a measure aggregated over one dimensions (e.g., coefficient of variation). When a high entropy is detected, the system can generate an edge (e.g., InfluencerEdge) in the knowledge graph. The edge may include a property which contains the entropy with double precision. The entropy can be used to suggest dimensions for which the measures already present have a high entropy in order to produce a graph that contains such measures. The entropy can also be used when computing other metrics.

In some implementations, the systems described herein can employ Pareto principle detection. Pareto principle detection can include computing a minimum percentage of dimension values that are used to reach 80 percent of a total of the measure. The measure is generally additive (e.g., sum or count). If less than 20% of the dimension values are necessary, the system detects an 80-20 Pareto principle and generates an edge (e.g., InfluencerEdge) in the knowledge graph from the measure to the dimension. This edge may have a property that contains the percentage of the dimension values to reach 80% of the total of the measure. The Pareto principle can be used to suggest a related visualization with a top explaining that 80% of the measure is obtained on less than 20% of the dimension values.

As shown in FIG. 9D, analyzing one dimension and one measure 912 can include focusing on dimensions where few members catch 80% of the total 946, aggregating the measure on the dimension 948, determining whether pruning is possible 950, analyzing distribution 952, and/or analyzing high/low values 954. Determining whether pruning is possible 950 may include analyzing how few or many members exist and determining how many members catch 80% of the data (e.g., many=3 clusters; few=TOP N or TOP 80%). Analyzing distribution 952 can include calculating a standard deviation or calculation skewness for ordered dimensions. Analyzing high values 954 can include determining unusually high values by analyzing influence on total, one or many UHV (e.g., datapoint/TOP N). Analyzing low values 954 can include analyzing unusually low values with very few members (e.g., keep all members), few members (e.g., discard ULV), or many members (e.g., discard TOP N).

Figure 9E:
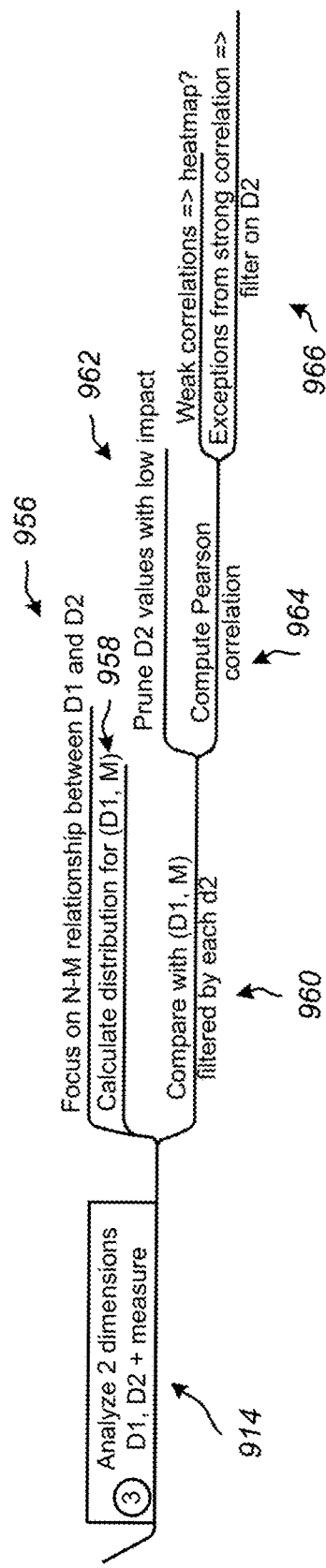

Referring to FIG. 9E, analyzing two dimensions and one measure 914 can include detecting divergences. For example, considering one measure and one dimension, the systems described herein can look for a filter on another dimension value which significantly changes the distribution of the measure on the first dimension. Such information can be stored in the knowledge graph in a vertex (Divergence) and three edges (DivergenceDimensionEdge), (DivergenceMeasureEdge), and (DivergenceFilterEdge). The (DivergenceDimensionEdge) applies to the sliced dimension. The (DivergenceMeasureEdge) applies to the measure. The (DivergenceFilterEdge) applies to the filtered dimension. The (DivergenceFilterEdge) may have a property which contains the value of the dimension that can be added as a filter to change the distribution and a coefficient indicating how much the distribution is modified by such a filter.

As shown in FIG. 9E, analyzing two dimensions and one measure 914 includes focusing on N-M relationship between the first and second dimensions 956, calculating distribution for the first dimension and the measure 958, and/or comparing the first dimension with the measure filtered by each second dimension 960. Comparing the first dimension with the measure filtered by each second dimension 960 can include pruning the second dimension values with low impact 962 and/or computing the Pearson correlation 964. Computing the Pearson correlation 964 may include determining weak correlations (e.g., generate a heatmap) and determining exceptions from the strong correlation (e.g., filter on the second dimension) 966.

Figure 9F:
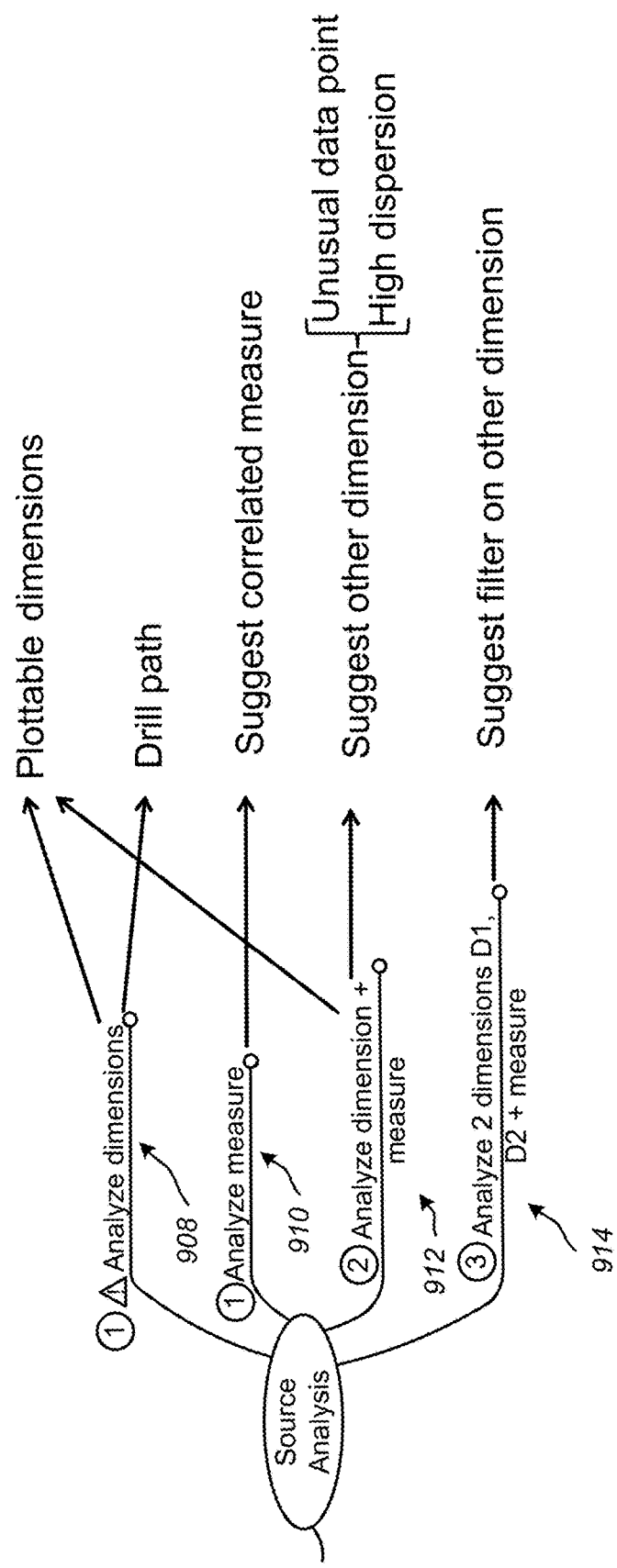

FIG. 9F depicts visualizations that can be provided to the user upon performing one or more processes depicted in FIGS. 9A-9E. For example, analyzing dimensions 908 can result in generating plot-able dimension visualizations and drill path visualizations. Analyzing measures 910 can result in generating visualizations with suggested correlated measures. Analyzing one dimension and one measure can result in generating plot-able dimensions and/or suggesting other dimensions with unusual data points or high dispersion, for example. Analyzing two dimensions and one measure 914 can result in generate visualizations with suggested filters on one or more of the dimensions.

Figure 10:
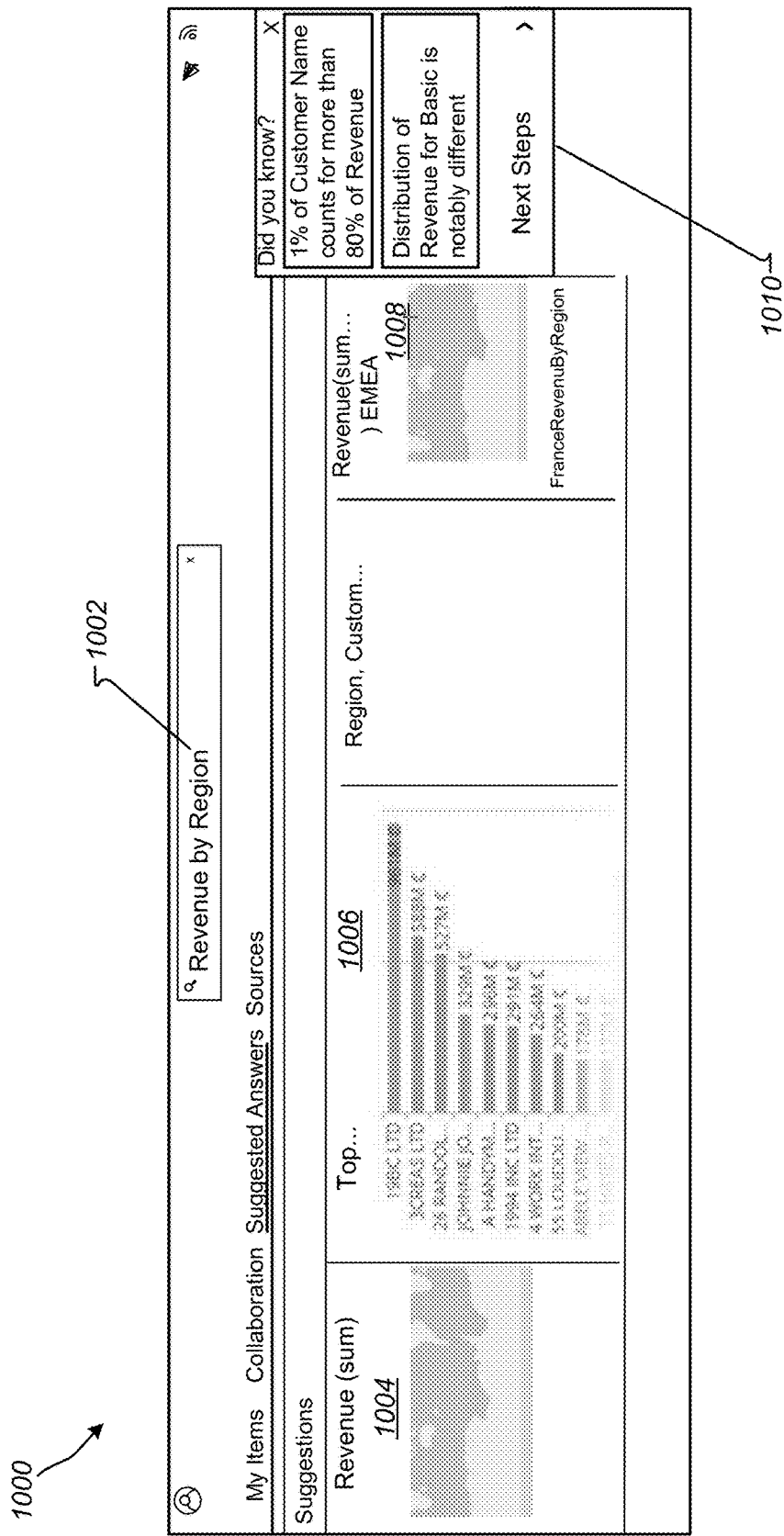
FIG. 10 is a screenshot illustrating an example user interface for providing data suggestions to a user.

FIG. 10 is a screenshot illustrating an example user interface for providing data suggestions to a user. In this example, the user may have entered the phrase "revenue by region" in the text box 1002 and selected enter to submit the phrase. The visualization corresponding to such a submission may be depicted as shown by 1004, 1006, and 1008. The visualizations may be displayed to the user for selection. The user in this example may have selected the visualization 1004 to be shown additional information (e.g., in panel 1010, for example). In the panel 1010, the user can see a fact about the visualization. In this example, the user may be presented with statistical insight such as "1% of the customers represent more than 80% of the revenue." This statistical insight information may have been found and provided using statistical analysis using statistical extractor 704, for example. The analysis may have previously stored the information in the knowledge graph at batch time, and at runtime. The suggest web application 710, for example, may have obtained this information using the statistical extractor 704 and provided the information to the user.

Other suggestions in panel 1010 may be provided in the event that the user selects different visualizations. In general, a pattern can be assessed for user entered text and the statistical extractor 704 can find information and store such information in the knowledge graph. At runtime, the suggest web application 710 can check validity of the pattern according to time and user context, for example before providing the information to the user. Selecting statistical insight content in panel 1010 can trigger display of additional visualizations that illustrate particular patterns used to obtain statistical insights.

Figure 11:
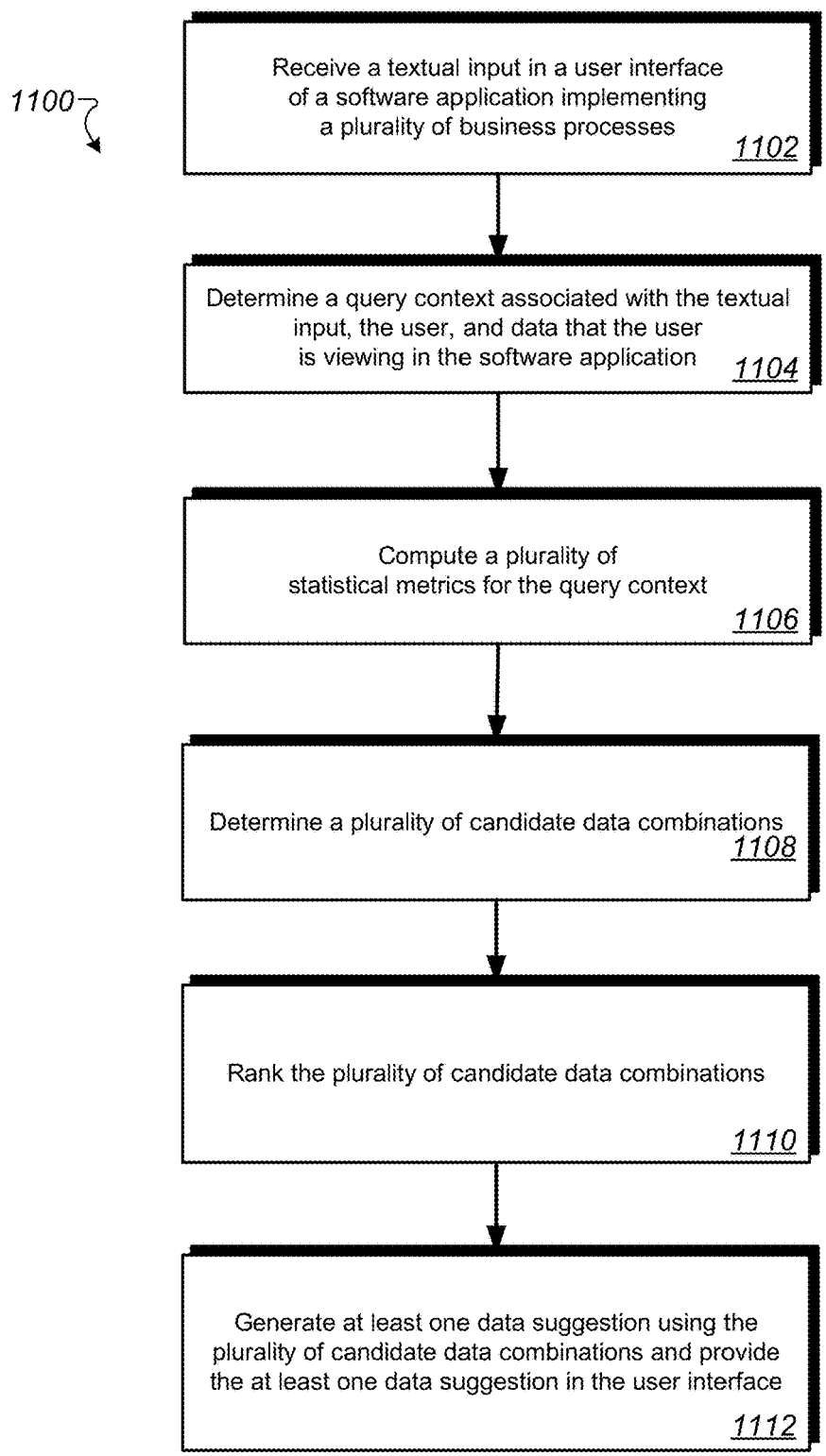
FIG. 11 is a flowchart illustrating example operations of the system of FIG. 1.

Referring to FIG. 11, an exemplary flowchart illustrates example process 1100 implemented in the system of FIG. 1. Process 1100 includes a computer-implemented method for generating a plurality of data suggestions. The process 1100 includes, receiving, from a user, a textual input in a user interface of a software application implementing a plurality of business processes (1102).

The process 1100 also includes determining a query context associated with the textual input, the user, and data that the user is viewing in the software application (1104). Determining a query context associated with the user and data that the user is viewing in the software application may include accessing user profiles and a plurality of datasets associated with the data the user is viewing, aggregating at least two of the plurality of datasets, and/or extracting information from the user profiles and the aggregated datasets to select a plurality of dimensions and measures that are configured to be correlated.

The process 1100 includes computing a plurality of statistical metrics for the query context, the statistical metrics being computed using information obtained from datasets associated with the query context (1106). The process 1100 also includes determining, using the statistical metrics, a plurality of candidate data combinations, the data combinations including a plurality of dimensions, measures, and filters compatible with the query context (1108). Determining a plurality of candidate data combinations may include modifying the query context by performing actions on a dataset associated with the query context, the actions selected from the group consisting of substituting one dimension for another dimension, adding a dimension, adding a measure, and adding a filter.

The process 1100 also includes ranking the plurality of candidate data combinations according to at least one of the plurality of statistical metrics (1110). The process 1100 also includes generating at least one data suggestion using the plurality of candidate data combinations and providing the at least one data suggestion in the user interface (1112). Providing the at least one data suggestions in the user interface can include providing a graphical representation of the data suggestion. The graphical representation may depict a pattern associated with the data suggestion and a plurality of actions to further modify the graphical representation based on the pattern.

The statistical metrics may be used to recommend one or more graphics corresponding to the at least one data suggestion. In some implementations, the statistical metrics may be used to select an additional correlated measure for at least one of the datasets associated with the query context, and provide the additional correlated measure as a basis for modifying the at least one data suggestion.

In some implementations, each statistical metric is modeled in a knowledge graph including a plurality of edges between a vertex, the plurality of edges representing a timestamp associated with a first discovery time for the metric, and a count for each additional discovery time associated with the metric. In some implementations, the statistical metrics include correlation calculations between one or more measures.

According to one general aspect, a computer-implemented method for generating a plurality of data suggestions is described. The method includes receiving, from a user, a textual input in a user interface of a software application implementing a plurality of business processes and determining a query context associated with the textual input, the user, and data that the user is viewing in the software application. The method also includes computing a plurality of statistical metrics for the query context. The statistical metrics may be computed using information obtained from datasets associated with the query context. The method also includes determining, using the statistical metrics, a plurality of candidate data combinations, the data combinations including a plurality of dimensions, measures, and filters compatible with the query context. Determining a plurality of candidate data combinations may include modifying the query context by performing actions on a dataset associated with the query context, the actions selected from the group consisting of substituting one dimension for another dimension, adding a dimension, adding a measure, and adding a filter. The method also includes ranking the plurality of candidate data combinations according to at least one of the plurality of statistical metrics and generating at least one data suggestion using the plurality of candidate data combinations and providing the at least one data suggestion in the user interface.

One or more implementations may include the following features. For example, the statistical metrics may include correlation calculations between one or more measures. In some implementations, the statistical metrics may be used to recommend one or more graphics corresponding to the at least one data suggestion. In some implementations, the statistical metrics may be used to select an additional correlated measure for at least one of the datasets associated with the query context, and provide the additional correlated measure as a basis for modifying the at least one data suggestion. In some implementations, each statistical metric is modeled in a knowledge graph including a plurality of edges between a vertex, the plurality of edges representing a timestamp associated with a first discovery time for the metric, and a count for each additional discovery time associated with the metric.

Determining a query context associated with the user and data that the user is viewing in the software application may include accessing user profiles and a plurality of datasets associated with the data the user is viewing, aggregating at least two of the plurality of datasets, and extracting information from the user profiles and the aggregated datasets to select a plurality of dimensions and measures that are configured to be correlated.

In some implementations, providing the at least one data suggestion in the user interface may include providing a graphical representation of the data suggestion, the graphical representation depicting a pattern associated with the data suggestion and a plurality of actions to further modify the graphical representation based on the pattern.

According to another general aspect, a query management system is described. The system includes instructions stored on a non-transitory computer-readable storage medium. The system further includes a dataset statistics engine configured to compute a first correlation between a plurality of measures, and compute a second correlation between a plurality of dimensions and determine dependencies between the plurality of dimensions. The system also includes a query engine configured to generate a plurality of search queries based on the first correlation and the second correlation, and a knowledge graph configured to store one or more correlations generated by the dataset statistics engine and to store time-based hierarchical data associated with a plurality of datasets.

One or more implementations may include the following features. For example, the dataset statistics engine may be configured to compute an exception between two or more correlated measures, compute a Pareto distribution for one or more additive measures, and/or compute an exception of a distribution for one or more dimensions, measures, or filters. The dataset statistics engine may be further configured to compute an entropy of at least one measure in the plurality of measures by aggregating the at least one measure over one dimension and in response to detecting the entropy above a predefined threshold level, the dataset statistics engine can generate an edge in the knowledge graph from the at least one measure to the one dimension. Using the predefined threshold level and the entropy, the dataset statistics engine can generate one or more data suggestions.

In some implementations, the dataset statistics engine can compute the correlation between the plurality of measures using an online Knuth algorithm by performing data shifting to avoid cancellation and loss of precision. The dataset statistics engine may additionally be configured to compute the correlation between the plurality of measures using a Pearson correlation coefficient.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method for generating a plurality of data suggestions, the method comprising:
   receiving, from a user, an input in a user interface of a software application implementing a plurality of software processes, wherein the input is tokenized to associate each token with a list of matching metadata;
   determining a query context, associated with the input, using an aggregated plurality of datasets, the plurality of datasets being selected for aggregation based on the input, credentials of the user, usage statistics, and data being presented in the user interface, wherein the datasets include the metadata;
   determining, using statistical metrics computed based on the query context and information obtained from the plurality of datasets, a plurality of candidate data combinations, the candidate data combinations including a plurality of dimensions, measures, and filters, from the aggregated datasets, that are determined to be compatible with the query context;
   determining an entropy of at least one measure in the plurality of measures by aggregating the at least one measure over at least one dimension to generate an edge of a knowledge graph from the at least one measure to the at least one dimension;
   ranking the plurality of candidate data combinations according to at least one of the statistical metrics;
   generating at least one data suggestion using the ranking and a determination that the entropy exceeds a predefined threshold level, wherein the statistical metrics are used to recommend one or more graphics corresponding to the at least one data suggestion; and
   providing the at least one data suggestion in the user interface.

2. The method of claim 1, wherein determining a plurality of candidate data combinations includes modifying the query context by performing actions on at least one dataset associated with the query context, the actions selected from the group consisting of substituting one dimension for another dimension, adding a dimension, adding a measure, and adding a filter.

3. The method of claim 1, wherein aggregating the plurality of datasets is performed based on a time associated with the dimensions, measures, and filters.

4. The method of claim 1, wherein the statistical metrics are used to select an additional correlated measure for at least one of the datasets associated with the query context, and provide the additional correlated measure as a basis for modifying the at least one data suggestion.

5. The method of claim 1, wherein each statistical metric is modeled in a knowledge graph including a plurality of edges between a vertex, the plurality of edges representing a timestamp associated with a first discovery time for the statistical metric, and a count for each additional discovery time associated with the statistical metric.

6. The method of claim 1, wherein determining a query context associated with the user credentials and data being presented in the user interface includes:
   accessing user profiles and the datasets, from the plurality of datasets, associated with the data being presented in the user interface;
   aggregating at least two of the accessed datasets; and
   extracting information from the user profiles and the aggregated datasets to select a plurality of dimensions and measures that are configured to be correlated.

7. The method of claim 1, wherein providing the at least one data suggestion in the user interface includes providing a graphical representation of the at least one data suggestion, the graphical representation depicting a pattern associated with the at least one data suggestion and a plurality of actions to further modify the graphical representation based on the pattern.

8. The method of claim 1, wherein determining the plurality of candidate data combinations includes aggregating and filtering of datasets using the query context to automatically generate at least one graphical depiction for each candidate data combination, each candidate data combination representing a search query suggestion to be presented in the user interface.

9. A non-transitory recordable storage medium having recorded and stored thereon instructions that, when executed, perform actions of:

receiving, from a user, an input in a user interface of a software application implementing a plurality of software processes, wherein the input is tokenized to associate each token with a list of matching metadata;

determining a query context, associated with the input, using an aggregated plurality of datasets, the plurality of datasets being selected for aggregation based on the input, credentials of the user, usage statistics, and data being presented in the user interface, wherein the datasets include metadata;

determining, using statistical metrics computed based on the query context and information obtained from the plurality of datasets, a plurality of candidate data combinations, the candidate data combinations including a plurality of dimensions, measures, and filters, from the aggregated datasets, that are determined to be compatible with the query context;

determining an entropy of at least one measure in the plurality of measures by aggregating the at least one measure over at least one dimension to generate an edge of a knowledge graph from the at least one measure to the at least one dimension;

ranking the plurality of candidate data combinations according to at least one of the statistical metrics;

generating at least one data suggestion using the ranking and a determination that the entropy exceeds a predefined threshold level, wherein the statistical metrics are used to recommend one or more graphics corresponding to the at least one data suggestion; and providing the at least one data suggestion in the user interface.

10. The non-transitory recordable storage medium of claim 9, wherein determining a plurality of candidate data combinations includes modifying the query context by performing actions on at least one dataset associated with the query context, the actions selected from the group consisting of substituting one dimension for another dimension, adding a dimension, adding a measure, and adding a filter.

11. The non-transitory recordable storage medium of claim 9, wherein aggregating the plurality of datasets is performed based on a time associated with the dimensions, measures, and filters.

12. The non-transitory recordable storage medium of claim 9, wherein the statistical metrics are used to select an additional correlated measure for at least one of the datasets associated with the query context, and provide the additional correlated measure as a basis for modifying the at least one data suggestion.

13. The non-transitory recordable storage medium of claim 9, wherein each statistical metric is modeled in a knowledge graph including a plurality of edges between a vertex, the plurality of edges representing a timestamp associated with a first discovery time for the statistical metric, and a count for each additional discovery time associated with the statistical metric.

14. The non-transitory recordable storage medium of claim 9, wherein determining a query context associated with the user credentials and data being presented in the user interface includes:

accessing user profiles and the datasets, from the plurality of datasets, associated with the data being presented in the user interface;

aggregating at least two of the accessed datasets; and extracting information from the user profiles and the aggregated datasets to select a plurality of dimensions and measures that are configured to be correlated.

15. The non-transitory recordable storage medium of claim 9, wherein providing the at least one data suggestion in the user interface includes providing a graphical representation of the at least one data suggestion, the graphical representation depicting a pattern associated with the at least one data suggestion and a plurality of actions to further modify the graphical representation based on the pattern.

16. The non-transitory recordable storage medium of claim 9, wherein determining the plurality of candidate data combinations includes aggregating and filtering of datasets using the query context to automatically generate at least one graphical depiction for each candidate data combination, each candidate data combination representing a search query suggestion to be presented in the user interface.

17. The system of claim 9, wherein the statistical metrics are used to select an additional correlated measure for at least one of the datasets associated with the query context, and provide the additional correlated measure as a basis for modifying the at least one data suggestion.

18. The system of claim 9, wherein determining a query context associated with the user credentials and data being presented in the user interface includes:

accessing user profiles and the datasets, from the plurality of datasets, associated with the data being presented in the user interface;

aggregating at least two of the accessed datasets; and extracting information from the user profiles and the aggregated datasets to select a plurality of dimensions and measures that are configured to be correlated.

19. A query management system including instructions stored on a non-transitory computer-readable storage medium storing instructions to cause the system to:

receiving, from a user, an input in a user interface of a software application implementing a plurality of software processes, wherein the input is tokenized to associate each token with a list of matching metadata;

determining a query context, associated with the input, using an aggregated plurality of datasets, the plurality of datasets being selected for aggregation based on the input, credentials of the user, usage statistics, and data being presented in the user interface, wherein the datasets include metadata;

determining, using statistical metrics computed based on the query context and information obtained from the plurality of datasets, a plurality of candidate data combinations, the candidate data combinations including a plurality of dimensions, measures, and filters, from the aggregated datasets, that are determined to be compatible with the query context;

determining an entropy of at least one measure in the plurality of measures by aggregating the at least one measure over at least one dimension to generate an edge of a knowledge graph from the at least one measure to the at least one dimension;

ranking the plurality of candidate data combinations according to at least one of the statistical metrics;

generating at least one data suggestion using the ranking and a determination that the entropy exceeds a predefined threshold level, wherein the statistical metrics are used to recommend one or more graphics corresponding to the at least one data suggestion; and providing the at least one data suggestion in the user interface.

20. The system of claim 19, wherein aggregating the plurality of datasets is performed based on a time associated with the dimensions, measures, and filters.

* * * * *